(12) United States Patent
Combs et al.

(10) Patent No.: US 6,523,065 B1
(45) Date of Patent: Feb. 18, 2003

(54) METHOD AND SYSTEM FOR MAINTENANCE OF GLOBAL NETWORK INFORMATION IN A DISTRIBUTED NETWORK-BASED RESOURCE ALLOCATION SYSTEM

(75) Inventors: Charles Combs, Las Cruces, NM (US); Jeffrey Gold, Stamford, CT (US); Brian Mair, New Canaan, CT (US); David Pedersen, Monument, CO (US); David Schear, Oradell, NJ (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/365,636

(22) Filed: Aug. 3, 1999

(51) Int. Cl.[7] .......................... G06F 15/173; G06F 15/16
(52) U.S. Cl. ....................................... 709/226; 709/201
(58) Field of Search ................................ 709/226, 209, 709/201, 202

(56) References Cited

U.S. PATENT DOCUMENTS

| 5,307,496 | A | * | 4/1994 | Ichinose et al. ............. 709/104 |
| 5,511,208 | A | * | 4/1996 | Boyles et al. ................. 707/10 |
| 5,819,019 | A | * | 10/1998 | Nelson ........................ 709/226 |
| 5,996,013 | A | * | 11/1999 | Delp et al. .................. 370/232 |
| 6,112,243 | A | * | 8/2000 | Downs et al. ............... 709/219 |
| 6,249,836 | B1 | * | 6/2001 | Downs et al. ................. 703/27 |
| 6,338,112 | B1 | * | 1/2002 | Wipfel et al. ............... 709/223 |
| 6,360,263 | B1 | * | 3/2002 | Kurtzberg et al. .......... 709/104 |

* cited by examiner

*Primary Examiner*—Krisna Lim

(57) ABSTRACT

A method and system for allocating distributed resources connected to a computer network to application programs running on computers attached to the communications network. The distributed resource allocator system comprises a number of identical processes running on one or more computers attached to the communications network. Application programs request allocation of resources from a local distributed resource allocator system process running using a resource allocator applications programming interface. Application programs request allocation of resource from a remote distributed resource allocator system process via a resource allocator access protocol. The distributed resource allocator system provides a means for the entry of new resources and new resource class and characteristics information in a shared directory. The resource allocator system also manages information about the capacities and capabilities of resources connected to the communications network. Application programs can thus be easily written to make use of distributed resources connected to a communications network without having to manage global network information without having to specify complex information regarding a resource or utilizing a variety of resource formats.

57 Claims, 22 Drawing Sheets

Resource Class Information Object

| Type Of Resource | Integer |
|---|---|
| Allocation Algorithm | Integer |

1001 → Type Of Resource row
1002 → Allocation Algorithm row

FIG. 10

| Operation | Description | Invoker | Performer |
|---|---|---|---|
| Bind | Begin a session | RA User | RAHS |
| Unbind | End a Session | RA User | RAHS |
| Register-Resource | Add resources to resource database | RA User | RAHS |
| Unregister-Resource | Removes a resource from the resource database | RA User | RAHS |
| Begin-Allocating-Resource | Begin allocation of a resource | RA User | RAHS |
| Stop-Allocating-Resource | Terminates the allocation of a resource | RA User | RAHS |
| Allocate-Resource | Perform resorce allocation function | RA User | RAHS |
| Set-Current-Capacity | Sets remaining capacity of an allocatable resource | RA User | RAHS |
| Deallocate-Resource | Releases an allocated resource | RA User | RAHS |
| Schedule-Task | Schedules a task to be performed by a resource | RA User | RAHS |
| Perform-Task | Instructs a resource to perform a scheduled task | RAHS | RA User |
| Provide-Next-Task | Allows a resource to request the next task of a series | RA User | RAHS |

FIG. 11

Register A New Resource

2002 Resource Name: _____ Existing Name
2003 Resource Class: [Select From Existing Classes ▶]
2004 Resource Domain: [Select From Existing Domains ▶]
2005 Resource Logical Address: _____ Existing Addresses
2006 Resource Physical Location: _____ Existing Locations
2007 Unit of Allocation: [Select A Number ▶]
2008 Resource Capacity: [Select A Number ▶]
Parent/Subordinate: [Select Type ▶] 2009
Simple/Complex: [Select One ▶] 2010
Permitted Actions: [Select One Or More ▶] 2011
Resource Characteristics: [Select One Or More ▶] 2012

[Verify] 2013  [Submit] 2014

[Help] 2015

METHOD AND SYSTEM FOR MAINTENANCE OF GLOBAL NETWORK INFORMATION IN A DISTRIBUTED NETWORK-BASED RESOURCE ALLOCATION SYSTEM

TECHNICAL FIELD

The present invention relates to communications networks and, in particular, to the exchange of data between users of computational resources connected to a communications network and a distributed resource allocation system that manages the use of those computational resources, including adding and deleting computational resources.

BACKGROUND OF THE INVENTION

A typical communications network comprises a number of computers and other electronic devices interconnected by a data transmission network. Data transmission networks include public switched telephone networks (PSTNs), ATM networks, internal intranets, the Internet and private networks implemented using any of a large number of available software and hardware components. Commonly, a computer is connected to a physical data transmission network through one or more physical ports, each port having a unique network address. Additional types of electronic devices may also be directly connected to a physical data transmission network or may be accessed from the physical data transmission network through an intermediate computer to which the electronic devices are attached. These additional electronic devices include modems, printers, switchboards, and audio response units.

Each computer attached to the network can execute one or more software programs. An instance of a running program is called a process. A person using a general purpose computer normally launches the execution of application programs. Application programs include word processing programs, web browsers, spread sheets, and computer games. Such programs will be called "users" in the following discussion. Application programs can, in turn, request and make use of operating system services provided by concurrently executing operating system programs. These services include the transfer of data from one general purpose computer to another over a physical data transmission network. The data may be transferred to another application program running on a remote computer or to a peripheral device such as a modem or a printer. An application program may also initiate execution of a program on a remote computer, transmit data to that program, and receive data back from that program over a physical data transmission network. The electronic devices, including computers, that a user may directly request services from, either directly or indirectly through operating system calls, are commonly referred to as computer resources.

FIG. 1 represents a schematic diagram of a simple communications network. The physical data transmission network 101 is represented as a central spoke and hub feature connecting the remaining elements in the diagram. These remaining elements include computers 102–106, users 107–110, and resources 112–118. One resource 112 is connected directly to the physical data transmission network. Resources 113–118 are indirectly connected to the network through computers. Tasks are processes running on a multitasking computer. Each task is launched by a user. The capacity of this multi-tasking computer 106 to run processes is considered a resource. Resources 112–118 represent printers, modems, switchboards, or other electronic devices.

A communications network, like the network displayed in FIG. 1, provides the potential for a user running on one computer to exchange data with, and request services from, remote resources connected to the network. For example, suppose computer 102 in FIG. 1 represents a personal computer running a software application program corresponding to user 107. Resource 113, which is attached directly to this personal computer, represents a black and white laser printer. Resource 114, which is directly connected to computer 104, represents a color printer. Suppose that user 107 has been directed to print out a color diagram. In order to print the color diagram, user 107 must send to computer 104, through the physical data transmission network, a file representing the diagram to be printed and a request that that file be printed out by the color printer 114.

Even in a simple communications network, like the one displayed in FIG. 1, attempts by several users to simultaneously access remote resources can lead to a number of problems. Continuing with the above example, suppose user 109 running on computer 106 has also been directed to print a color diagram, and that user 109 sends a request to computer 104 to print the color diagram on color printer 114 at about the same time as user 107 sends its request. In such a case, users 107 and 109 are said to contend for resource 114. Such a contention may be resolved by queuing the requests in the order that they arrive at computer 104 and submitting the queued requests one at a time to the color printer. This means, however, that if user 107 made its request slightly ahead of user 109, user 109 must wait until the request made by user 107 has been completed. Suppose resource 118, connected to computer 103, is also a color printer. User 109 could avoid the delay incurred by waiting for color printer 114 to finish printing the request made by user 107 by instead sending the request to color printer 118, thus balancing the load between the two color printers. However, in order to do so, user 109 would have to know that there are two color printers accessible via the network and that color printer 114 is currently busy with another task while color printer 118 is currently free. This further implies that user 109 must have essentially global information about the entire communications network. Such global information is dynamic rather than static. Printers can be turned on and off, for instance, or additional resources can be added to the network. Another problem encountered by users of distributed resources is that of determining the capabilities of those distributed resources. It is far beyond the capability of application programs to acquire and maintain dynamic global network information. Even if a particular application program could be written to acquire and maintain dynamic global information, every other software application program would also need to be written with this capability. Such redundancy is prohibitively expensive and inefficient.

SUMMARY OF THE INVENTION

The present invention provides a method and system for exchanging data between a user and a distributed resource allocator handling system that allocates computer resources connected to a communications network to users requesting those resources. The distributed resource allocator handling system comprises a number of resource allocator system agents, each running as a separate process on a computer connected to the network. Each resource allocator system agent maintains a database of global network resource information, freeing application programs from the necessity of maintaining such information. The resource allocator system agents constantly communicate with all other resource allocator system agents that comprise the distributed resource allocator handling system to ensure that each resource allocator system agent has the same global network information. A resource allocator system agent may be accessed directly by a user running on the same computer via an applications programming interface, or may be accessed by a user running on a remote computer via a communications protocol that provides the same functional interface as that provided by the applications programming interface. Resource allocator system agents communicate one with another using a different communications protocol. The elements of the resource allocator handling system provide a facility for entering information regarding resources, including the ability to add or delete a resource. In this manner, the application programs are freed from the necessity of acquiring and maintaining resource information on their own.

The present invention also provides a method and system for registering new resources and the components that comprise the resources of the distributed resource allocation handling system. A resource allocator receives a request to add a new resource to the plurality of resources in the distributed resource allocation handling system. A distributed resource database comprises data regarding the plurality of resources in the distributed resource allocation handling system. A resource verifier examines the new resource request to determine if the new resource request is compatible with the plurality of resources in the distributed resource allocation handling system. The network also includes a global directory that comprises data regarding the components that comprise the various resources within the distributed allocation handling system. A request to add a new resource includes resource component data that is compatible with the resource components stored in the global directory.

BRIEF DESCRIPTION OF THE DRAWINGS

A preferred embodiment of the present invention will be described below relative to the following figures.

FIG. 10 displays a resource class information object.

FIG. 11 displays a high-level functional description of the resource allocator application programming interface as well as the resource allocation access protocol.

FIG. 20 is a front elevational view of a computer screen showing an exemplary user interface that would be provided to a technician or system administrator for the entry of a new resource.

DETAILED DESCRIPTION OF THE INVENTION

The present invention provides a method and system both for exchanging function calls and data between a user and a distributed resource allocator handling system that allocates computer resources to users, as well as for exchanging data between components of the distributed resource allocator handling system. The distributed Resource Allocator Handling System ("RAHS") coordinates resource allocation among multiple users, balancing the workload assigned to similarly capable resources, resolving contentions between users, and acquiring and maintaining information about the capabilities of the distributed resources. Because the RAHS comprises a number of identical separate processes running on two or more computers, the RAHS can survive individual process and machine failures, thus providing fault tolerant resource allocation.

Figure 1:
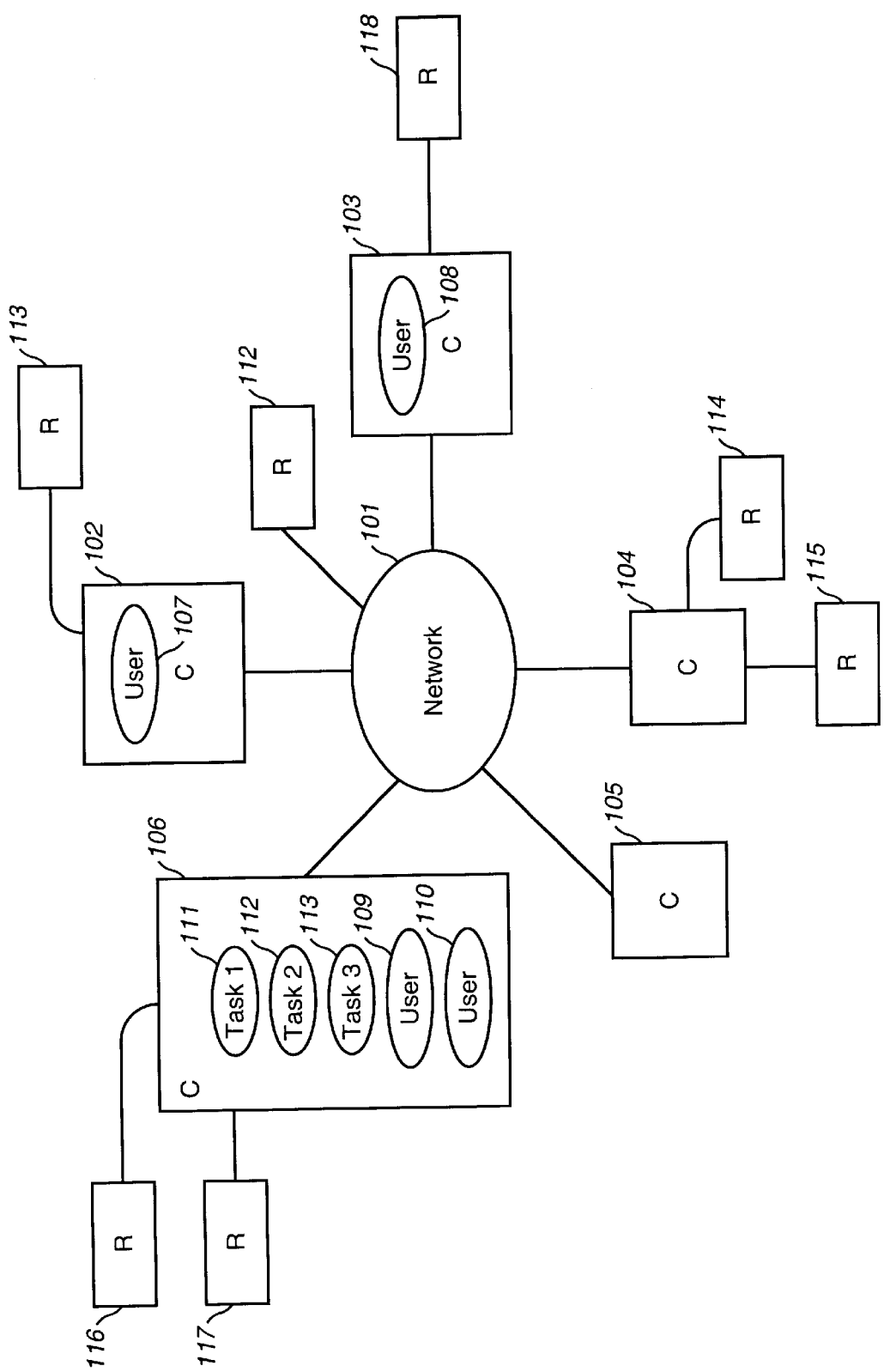
FIG. 1 displays a schematic diagram of a simple communications network.
Figure 2:
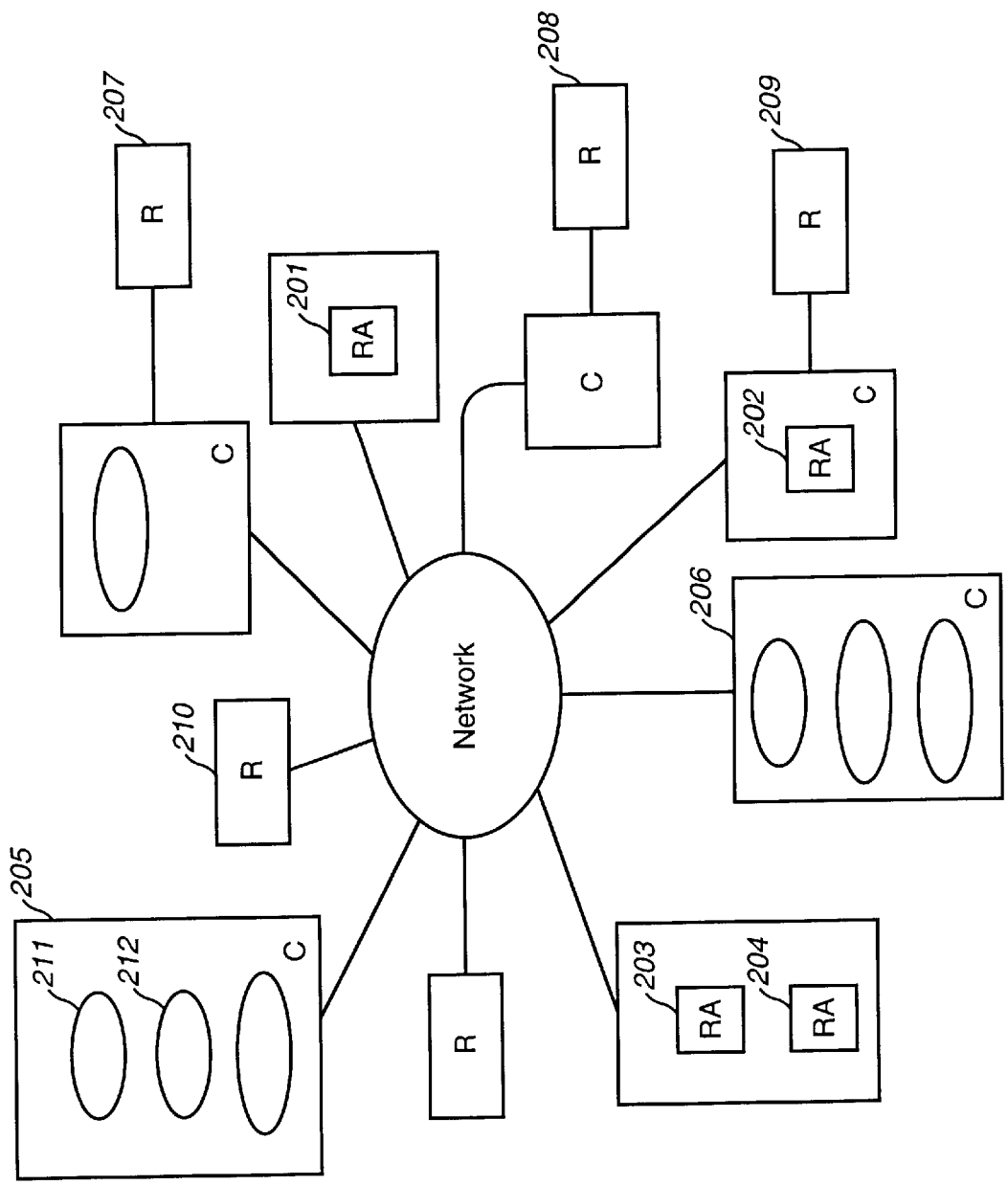
FIG. 2 displays the same communications network as displayed in FIG. 1 with the addition of the resource allocator handling system.

FIG. 2 displays a communications network, similar to the one displayed in FIG. 1, that comprises a RAHS. The RAHS comprises a number of resource allocator system agents ("RASAs") that run as separate processes on computers of the communications network. Four resource allocator system agents 201–204 are running on three of the computers of the network in FIG. 2. It is desirable to have two RASAs running on the same computer, exactly mirroring each other's operations, as in the case of RASAs 203 and 204. Failover is relatively easily and rapidly achieved in the case that one of the two co-located RASAs fails or encounters an error condition. However, co-located RASAs are not required for fault-tolerant operation. Any one of the RASAs can substitute for any other RASA running on the communications network.

There are three basic types of information exchange that occur in the context of a RAHS. Users must call functions provided by a resource allocator application programming interface ("RA-API") that are executed by a RASA in order to acquire, relinquish, and use computer resources. In the case that a user runs on a different computer than the RASA to which the function call is directed, the function call is packaged into a resource allocator access protocol ("RAAP") message for transport to the RASA that will execute the function call. Data returned to the user in response to the execution of the function call by the RASA is packaged into a return RAAP message and transported back to the user. Finally, each RASA maintains a global network information database ("GNID") that describes the state of the RAHS as a whole. When a RASA executes a function of the RA-API that causes the state of the RAHS to change, for example, a function that allocates a resource to a particular user, that RASA must inform the remaining RASAs of the RAHS that the resource has been allocated to the user, so that each of the remaining RASAs can appropriately update its GNID. The RASAs communicate among themselves using a resource allocator system protocol ("RASP"). The present invention thus comprises the RA-API, the RAAP, and the RASP.

The resources managed by the distributed resource allocator fall into two different categories. A resource may be either task-oriented or interaction-oriented. A task-oriented resource is a resource for which requests are queued and serviced by the resource one at a time. A printer is an example of a task-oriented resource. Each request to print a file is queued upon arrival at the printer. The printer retrieves requests one at a time from the queue and executes each request in its entirety before moving on to the next queued request. Once a user makes a request of the printer, no further interaction between the user and the printer is required. The user may simply wait until the task has been finished and acknowledged by the printer, or may, in some cases, proceed with other computing tasks while waiting for the acknowledgment.

Interaction-oriented resources, on the other hand, require continued communication between the user and the resource while the user's request is being serviced. An example of such an interaction-oriented resource is a modem. Typically, a user establishes a connection with a remote user through an initial request to the modem for a connection, and then engages in a dialog comprising a number of separate requests for transmitting data interleaved with reception of data from the remote user, followed finally by a request to terminate the connection.

Resources may be either simple or complex. Simple resources are single independent resources. Simple resources include ports, terminals, and modems. A complex resource is a collection of subordinate resources that are dependent on a common superior resource. A multitasking computer that is capable of running a number of separate processes is an example of a complex resource. Each process that runs on a multitasking computer is a subordinate resource, and the computer itself is the superior resource on which these subordinate resources depend. In FIG. 2, resources 207, 208, and 209 represent printers. These three resources are simple, task-oriented resources. Resource 210 represents a high-speed modem. Resource 210 is a simple interaction-oriented resource. The multitasking computers 205 and 206 in FIG. 2 represents complex task-oriented superior resources, and the tasks 211 and 212 running on computer 205 represent complex subordinate resources.

Figure 3:
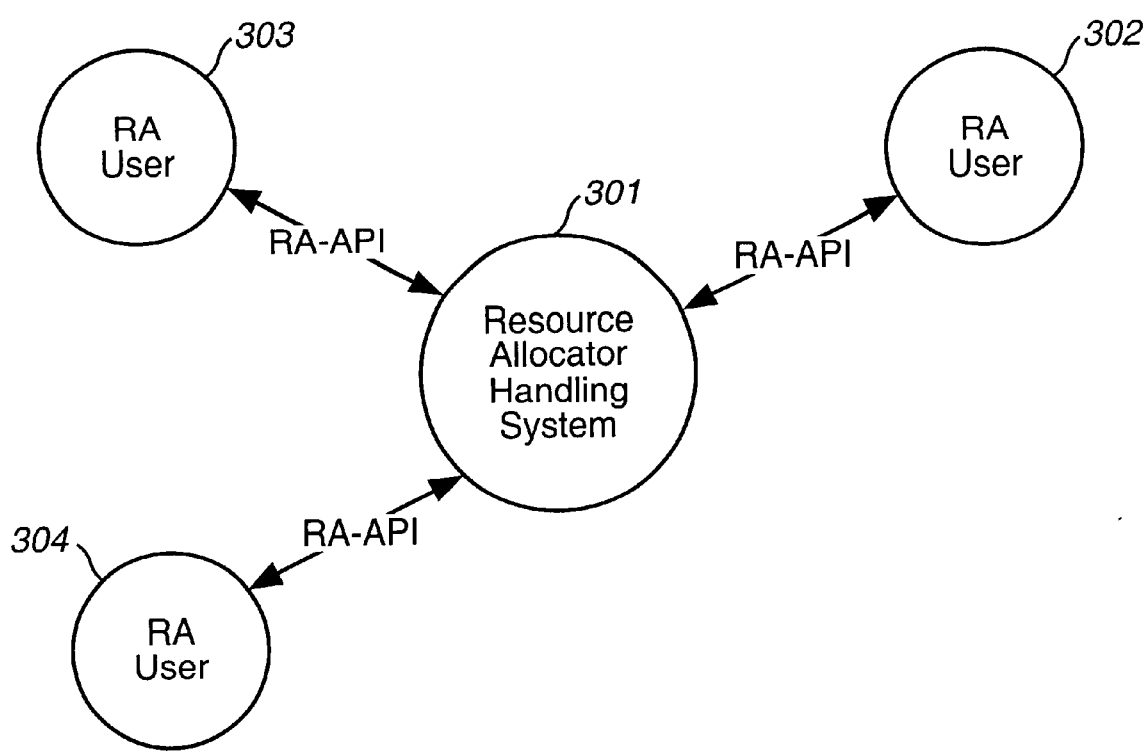
FIG. 3 displays the functional interface between users and the resource allocator handling system.
Figure 4:
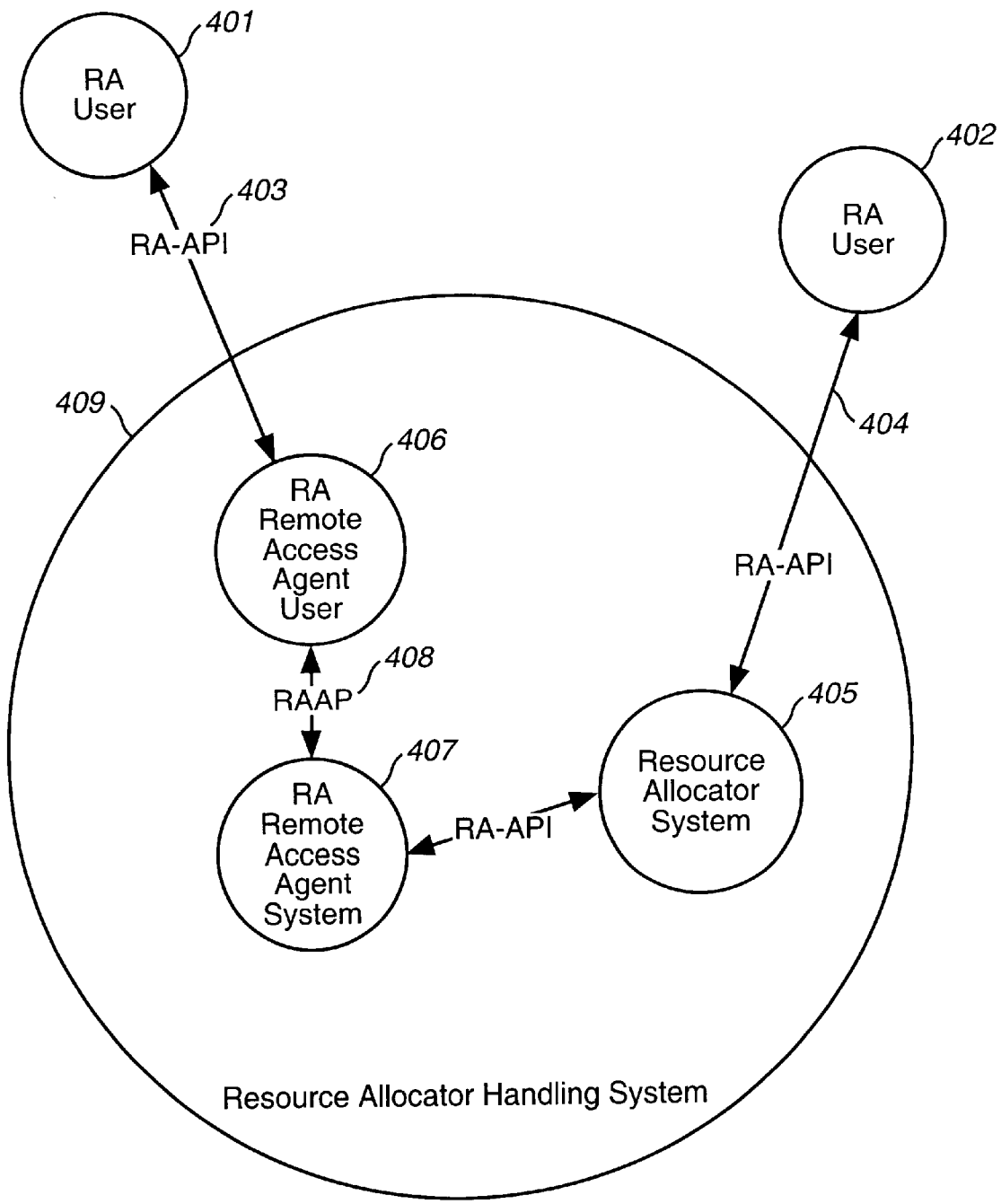
FIG. 4 displays a more detailed view of the resource allocator handling system functional interfaces.
Figure 5:
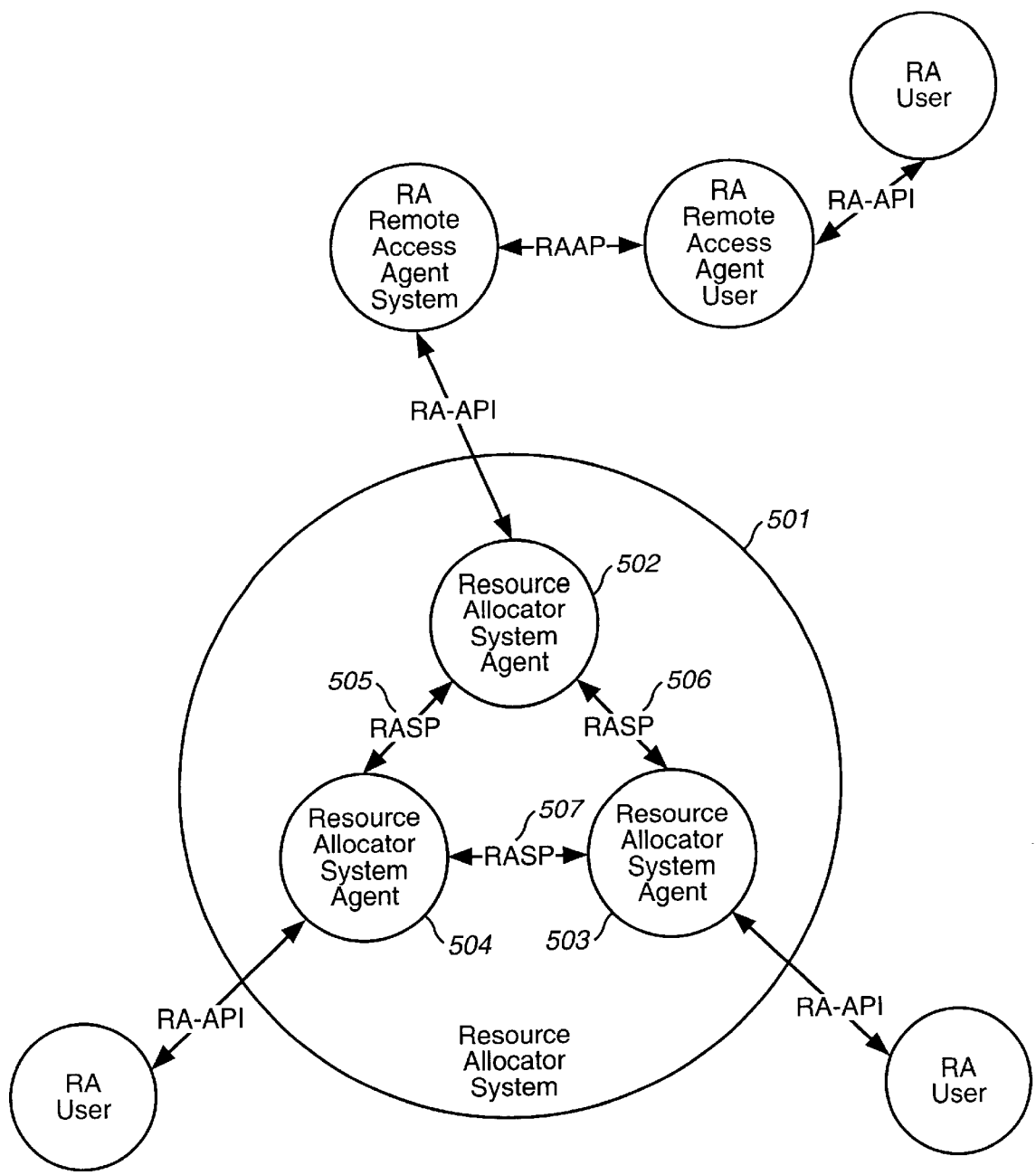
FIG. 5 shows an expanded view of the resource allocator system.

FIGS. 3–5 illustrate, in increasing detail, a functional model of the interfaces and protocols of the RAHS. FIG. 3 displays the functional interface between users of the RAHS and the RAHS as a whole. The RAHS 301 includes all separately executing RASAs running on computers connected to the communications network. Users 302–304 represent separate application programs that make requests for services of resources managed by the RAHS. The interface between the users and the RAHS, shown in FIG. 3 as bidirectional arrows between the users and the RAHS, is the RA-API, a collection of functions called by a user and executed on the user's behalf by the RAHS or called by the RAHS and executed by a user/resource.

FIG. 4 shows a somewhat more detailed view of the functional interfaces within the RAHS. The RAHS 409 in FIG. 4 has been expanded to show several additional components not shown in FIG. 3, including the resource allocator system 405 that comprises a number of RASAs. As in FIG. 3, users 401 and 402 interface to the RAHS by means of the RA-API, shown in FIG. 4 as bidirectional arrows 403 and 404.

In the expanded view of FIG. 4, it can be seen that a user may interact either directly or indirectly with the resource allocator system 405. An example of a direct interaction between a user and the RAHS is the interaction between user 402 and the resource allocator system 405 through the RA-API interface 404. An example of an indirect interaction between a user and the RAHS is the interaction between user 401 and the resource allocator system 405. The indirect interaction requires two additional RAHS components: a remote access agent user ("RAAU") 406 and a remote access agent system ("RAAS") 407. These two components serve to package RA-API calls and returned data into RAAP messages and to transport the RAAP messages over the computer network. This indirect interaction is employed when the user is running on a different computer system than the computer running the RASA to which it is interfacing. To indirectly access a remote RASA, the user interacts directly with a RAAU running on the same system as the user using the RA-API. That RAAU then communicates with a RAAS running on the same system as the RASA using the RAAP 408. The RAAS then communicates directly to the RASA running on the same computer as the RASA using the RA-API. Thus, when a user requests services from a RASA running on a remote computer, it makes those requests using the very same RA-API as it would use to make requests of a RASA running on the local computer system, and the RAAU and RAAS handle the details of transporting the RA-API over the computer network.

FIG. 5 shows an expanded view of the resource allocator system 501. The resource allocator system of FIG. 5 comprises a number of RASAs 502–504. The RASAs may run on any number of computers connected to the network, and multiple RASAs may run on the same computer. The RASAs communicate with each other using the RASP 505–507. The RASP provides an additional interface within the resource allocator system that allows each RASA to synchronize its database and its allocation and management activities with those of the other RASAs within the RAHS.

The RASP is symmetrical and supports services for the distributed aspects of the RAHS that allows resource sharing across resource management domains and synchronizes the RASAs' knowledge of maintained resources. The services provided by the RAHS through the RASP include establishing bindings with RASAs and releasing established bindings. The full complement of RASP services provided may be enhanced by an underlying database. Otherwise, the resource allocator system defines the actual services of the RASP.

The RASP usage protocol specifies the acceptable order in which services may be invoked by a RASA. The RASP bind service authenticates the RAAU and RAAS and, if successful, establishes a binding between the RA user and the RAHS. The success of the binding activity depends upon successful completion of the authentication process and the establishment of connectivity between the RAAU and the RAAS. The arguments provided to the RASP bind service include RASA invoker credentials, service priority, RASP version, and RASA invoker binding context. The RASA invoker credentials authenticate the identity of the RASA invoker. The RASA invoker credentials include the name of the RASA to which the RASA invoker is binding and the password of the RASA. The RASA performer authenticates the RASA invoker by comparing the RASA invoker's password to the password in the RASA invoker's directory entry. If the comparison is positive, authentication is successful. The RASP version argument includes the RAHS services version that the RASA invoker supports. The RASA invoker binding context argument includes the context identifier which the RASA invoker uses to correlate subsequent activity associated with this binding.

The arguments provided to the RASP unbind service are the RASA invoker binding context, the RASA performer binding context, and a service priority. The RASA performer binding context argument includes the context identifier which the RASA performer uses to correlate subsequent activity associated with this binding. The RASA performer generates the RASA performer binding context upon successful completion of the RASP bind service. The RASA invoker is required to use this value in all subsequent operations with the RASA performer.

Figure 6:
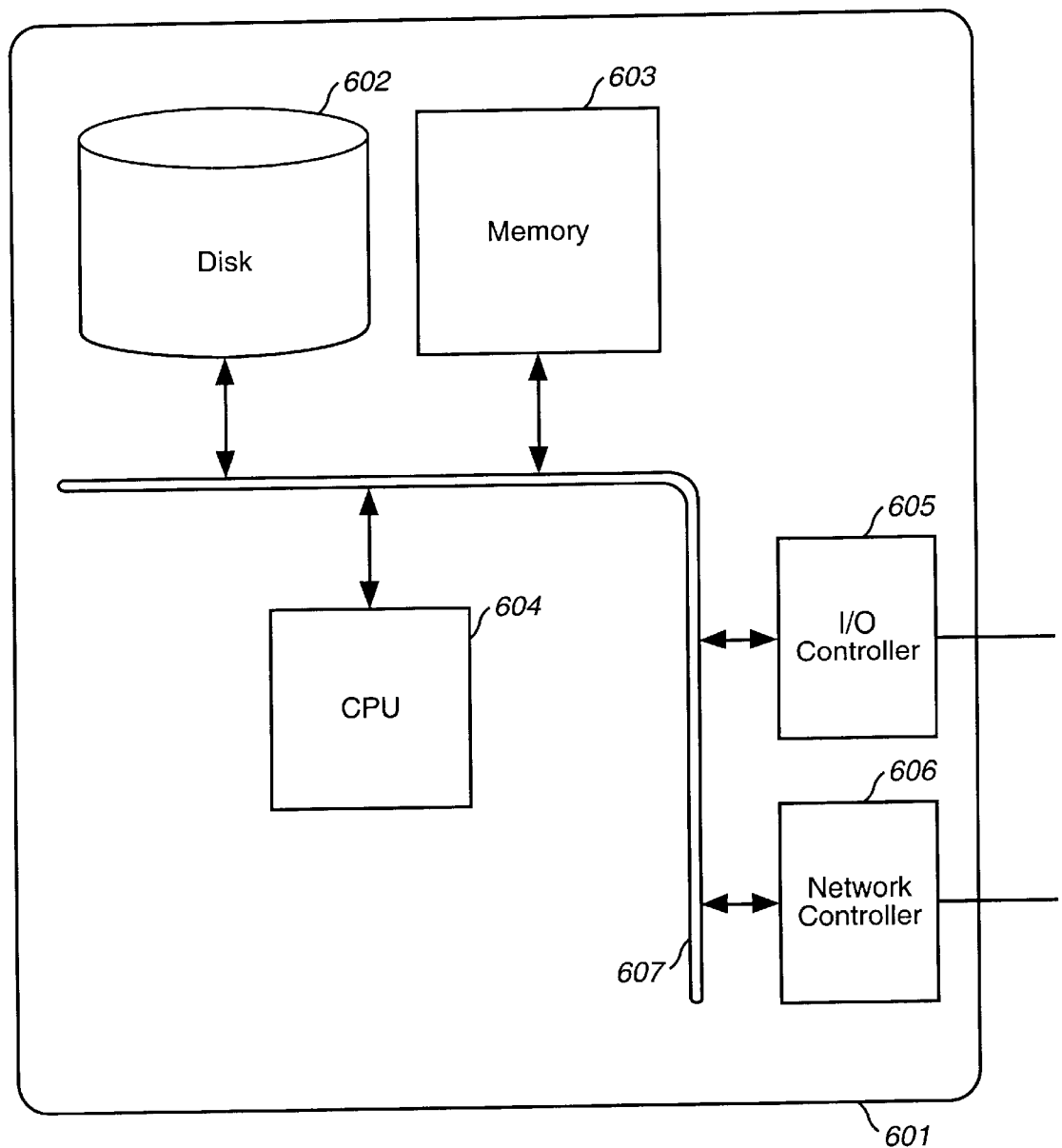
FIG. 6 is a simple diagram of a generalized computer on which the user and resource allocator system agents are executed.

FIG. 6 is a simple diagram of a generalized computer on which the various processes described above are executed. The computer 601 comprises a non-volatile data storage device, commonly a disk drive, 602, high-speed random access memory 603, a central processing unit 604, one or more input/output controllers 605, and a network controller 606. These various components exchange data over at least one internal bus 607. Software programs reside in files on the disk drive. A software program is started by moving all or a portion of the program stored on disk into memory. The central processing unit (CPU) retrieves instructions one after another from memory and executes them. Data transmission from such a computer to a physical data transmission network is accomplished under CPU control by moving data from the computer's memory over the internal bus to the network controller from where it is formatted, packaged, and transmitted to the physical data transmission network. Input/Output controllers and network controllers each generally comprise simple memory storage devices and microprocessors.

Figure 7:
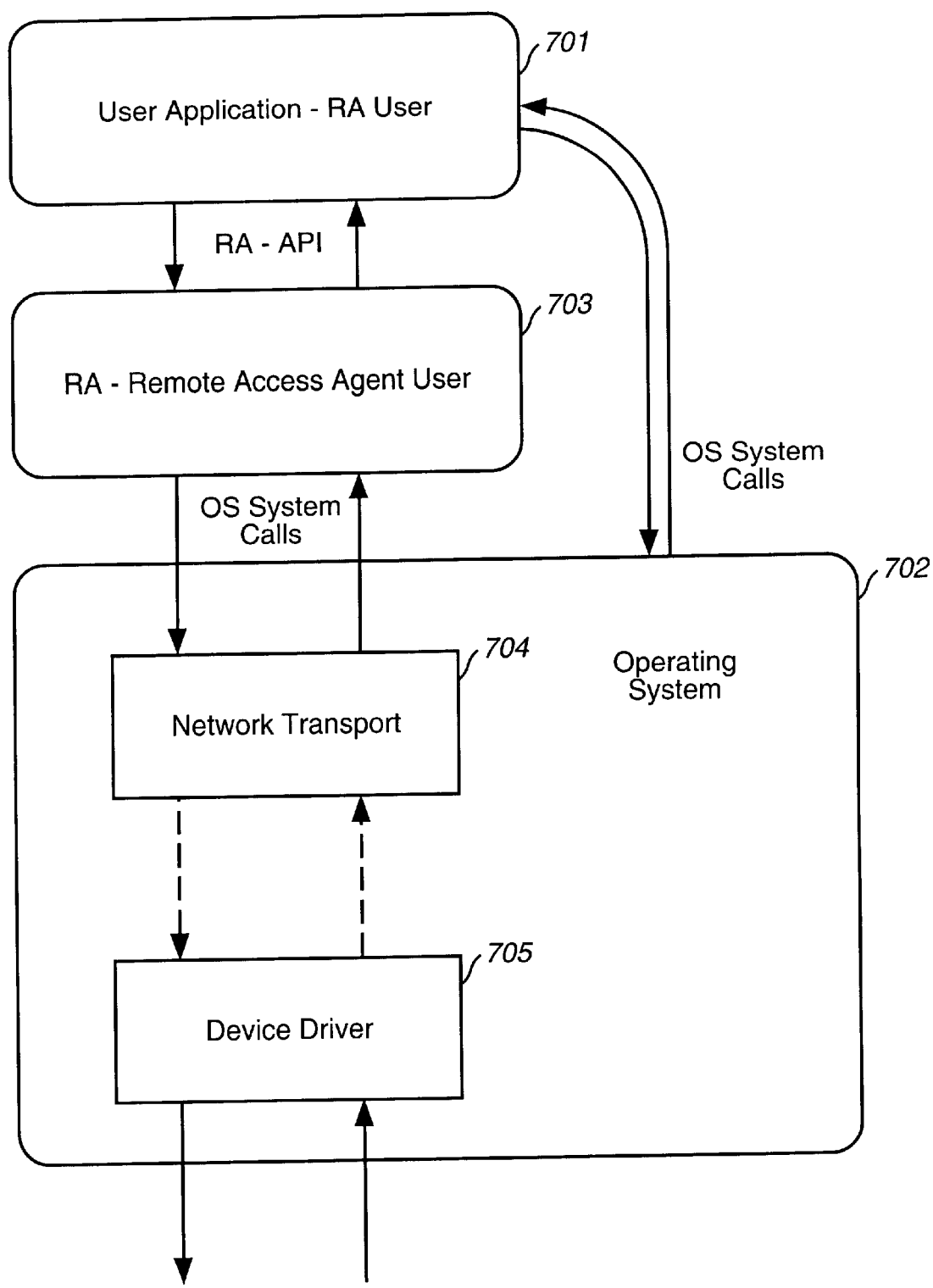
FIG. 7 displays a simple schematic diagram of some of the processes involved in implementing a communications network.

FIG. 7 displays a very simple schematic diagram of some of the processes that run on a computer system in order to allow the computer system to exchange data using a communications network. At the highest level is an application program 701. Such programs are generally written in high-level languages and provide the interface between a computer and a human user. The operating system 702 comprises a collection of programs that provide services to application programs through the operating system call interface. The operating system call interface provides to an application program functions that the application program can invoke to read and write data to and from the hard disk, transmit data over physical data transmission networks to remote computers, print files on a printer, and other such tasks. In addition, the operating system provides and maintains a program execution environment on a computer that allows for application programs and other intermediate processes to execute in a coordinated fashion. The RAAU 406 in FIG. 4 may run as a separate process in a computer, as shown in FIG. 7. The application program 701 communicates with the RAAU 703 using the RA-API. The RAAU in turn makes operating system system calls in order to package and send RA-API requests to a RAAS on a remote computer using the RAAP. The RAAU packages a RA-API call, along with its arguments, into a data message and passes that data message to the operating system. A subroutine or subprocess within the operating system responsible for network transport 704 further processes and packages the data message in accordance with a lower level network transport protocol. The message is then queued in memory to a very low-level operating system process called a device driver that is responsible for interacting with the network controller to actually send the packaged message over the physical data transmission network. The RAAU may also be implemented as a set of library functions that are linked to the application program, and therefore, together with the application program, constitute a single executable process on a computer.

Figure 8:
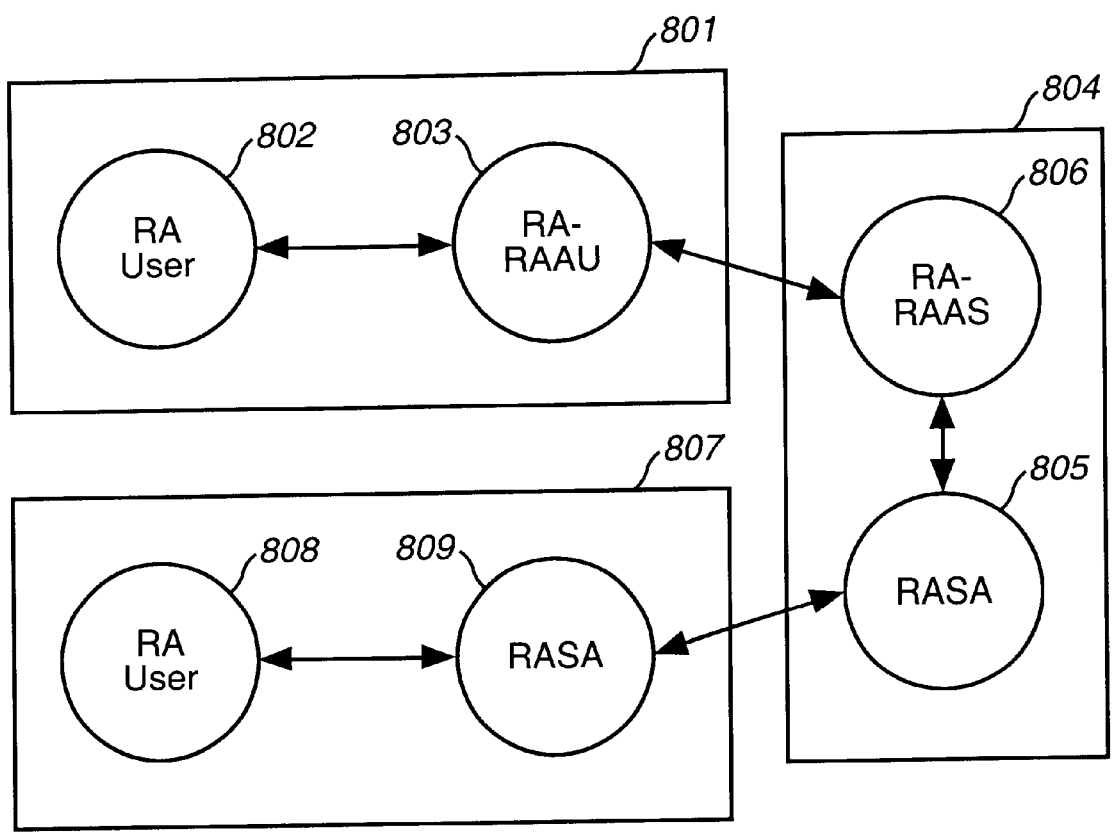
FIG. 8 displays the three basic types of resource allocator handling system component configurations.

FIG. 8 displays the three basic types of RAHS hardware component configurations. Computer 801 includes a user 802 and a RAAU 803. Computer 801 does not contain a RASA. Therefore, the user 802 must request allocation of distributed resources from a RASA located on a remote computer. Computer 804 includes a RASA 805 and a RAAS 806. No users run on computer 804. Therefore, the RASA 805 on computer 804 must receive allocation requests from users on remote computers and respond to those requests via the RAAS 806. Finally, computer 807 includes both a user 808 as well as a RASA 809. The user 808 can therefore make allocation requests and receive responses to those requests directly to and from the local RASA 809 using the RA-API. The local RASA 809 also communicates with remote RASAs, such as with RASA 805 using the RASP, in order that all RASAs exactly mirror each other's global network database and monitor each other's allocation activities.

Figure 9:
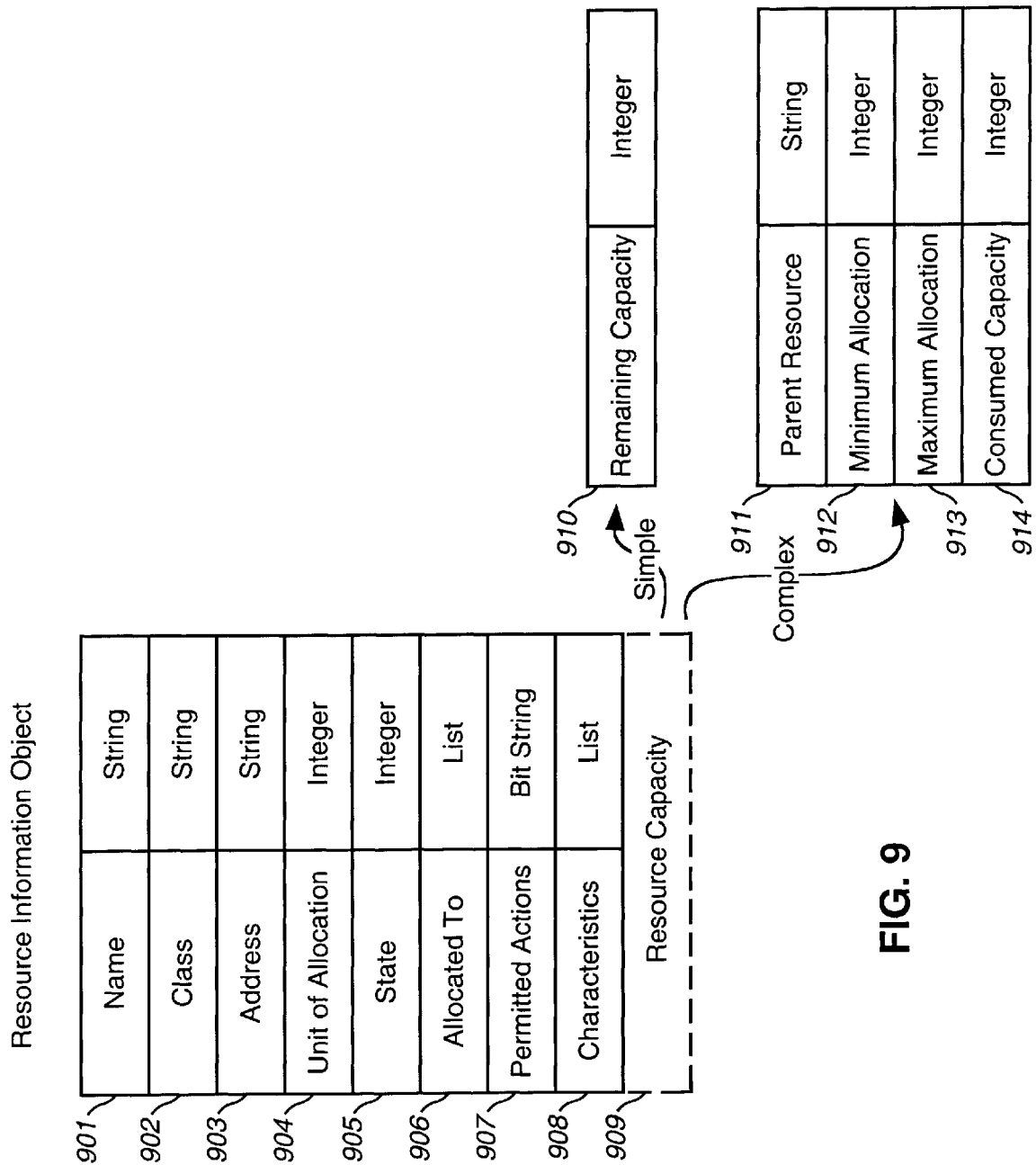
FIG. 9 displays a resource information object.

FIG. 9 displays a resource information object ("RIO"). The RASAs maintain in their GNIDs one RIO for every resource managed by the RAHS. The RIO is a collection of data fields, each having a corresponding data type. The field "name" 901 is a character string that uniquely and unambiguously identifies the resource described by a RIO. The field "class" 902 is a character string that identifies the class of resources to which the resource belongs. A resource may belong to only one class. The field "address" 903 is a character string that includes the network address of the resource. This address is provided to users when the resource is allocated to them so that the user may directly bind with an interactive resource.

The field "unit-of-allocation" 904 is an integer that specifies the amount of resource capacity that is consumed by each allocation of the resource. For instance, if the resource is a bank of ten modems, then the unit of allocation for that resource would be one, since the smallest unit of allocation would be a single modem. The capacity of that resource would be ten, since a total of ten units of allocation may be allocated. The field "state" 905 is an integer that describes the current state of the resource. A resource may have one and only one state. Resource states will be discussed further below. The field "allocated-to" 906 includes a list of user names and identifies those users to which the resource has been allocated. This field includes a list because a given resource may be allocated to more than one user. In the example cited above, for example, several different users may be allocated one or more modems from the bank of ten modems. The field "permitted-actions" 907 is a bit string that specifies the kinds of operations that may be performed by the resource. There is one bit within the bit string that corresponds to allocation operations, indicating, when set to one, that the resource described by the RIO may be allocated. Another bit within the bit string corresponds to task operations, indicating, when set to one, that tasks may be submitted to the resource described by the RIO. The contents of the permitted actions field along with the contents of the state field together represent the possible state transitions that a resource may undergo, starting from its current state, as a result of a single event or RA-API call.

The field "characteristics" 908 is a list of character strings that further specify characteristics particular to the resource described by the RIO, and may be used, for example, by a user to precisely narrow resource selections to only those resources of interest. The field "resource-capacity" 909 has two different forms, depending on whether the resource described by the RIO is a simple resource or a complex resource. In the case of a simple resource, the resource-capacity field comprises a single data element called "remaining-capacity" 910, an integer describing the number of allocation units yet to be allocated. For example, in the case of a bank of ten modems, three of which have been allocated previously to other users, remaining capacity would have the value of 7, indicating that seven modems are available for allocation. In the case of a complex resource, the resource-capacity field comprises the four data elements 911–914. The field "parent resource" 911 is a character string name of the parent resource for the complex resource. In the case of a multitasking computer having subordinate resources corresponding to processes that may be executed on the computer, the parent resource would be the name that uniquely identifies the multitasking computer. The fields "minimum-allocation" 912 and "maximum-allocation" 913 are integers that represent the minimum and maximum limits on the usage of the parent resource. The field "consumed-capacity" 914 is an integer that represents the percentage of allocatable subordinate resources that have already been allocated.

In one exemplary embodiment of the invention, initial data fields for a resource's RIO may arrive at a GNID from the resource itself. For example, the resource may include a data structure in microcode that may be transmitted into the GNID. In yet another alternate exemplary embodiment, the GNID comprises data dispersed throughout the managed resources. In this embodiment, the GNID database may include data stored within the resource itself and data stored with the RAHS.

Along with RIOs, each RASA maintains information about the various resource classes available on the communications network. FIG. 10 displays a resource class information object that comprises two data fields and that is stored in the GNID maintained by each RASA. The field "type-of-resource" 1001 is an integer that represents the type of the resource represented by this resource class. This field can indicate whether the resource is a complex superior resource, a complex subordinate resource, or a simple resource. The field "allocation-algorithm" 1002 is an integer that specifies one of many possible allocation algorithms by which the resource is to be allocated when requested by users.

The table displayed in FIG. 11 is a high-level description of the interface provided by the RA-API and RAAP. This is essentially a list of the functions provided to users by the RAHS. In the case of one function, "Perform-Task," the RAHS invokes the function and a user performs the function. For all other functions, the RAHS performs the function at the request of the user.

The functions "Bind" and "Unbind" are used to begin a session and end a session, respectively, between a user and the RAHS. The functions "Register-Resource" and "Unregister-Resource" cause a RAHS to add and delete resource information objects from the global network information database. The functions "Begin-Allocating-Resource" and "Stop-Allocating-Resource" cause the RAHS to make a resource available for allocation to users and to terminate allocation of a resource by users, respectively. The function "Allocate-Resource" represents a request by a user to allocate a resource for subsequent use. The function "Set-Current-Capacity" allows a resource acting as an RA user to set the remaining capacity field of the RIO corresponding to that resource stored in the GNID. The function "Deallocate-Resource" represents a request by a user to release a resource that the user has previously allocated. The function "Schedule-Task" essentially represents a request by a user to queue a task to a task-oriented resource. The function "Perform-Task" is called by the RAHS to cause a user, in this case the user being a resource, to perform a scheduled task. Finally, the function "Provide-Next-Task" allows a user, in this case a resource, to request from the RAHS the next task of a series of tasks to be performed.

Figure 12:
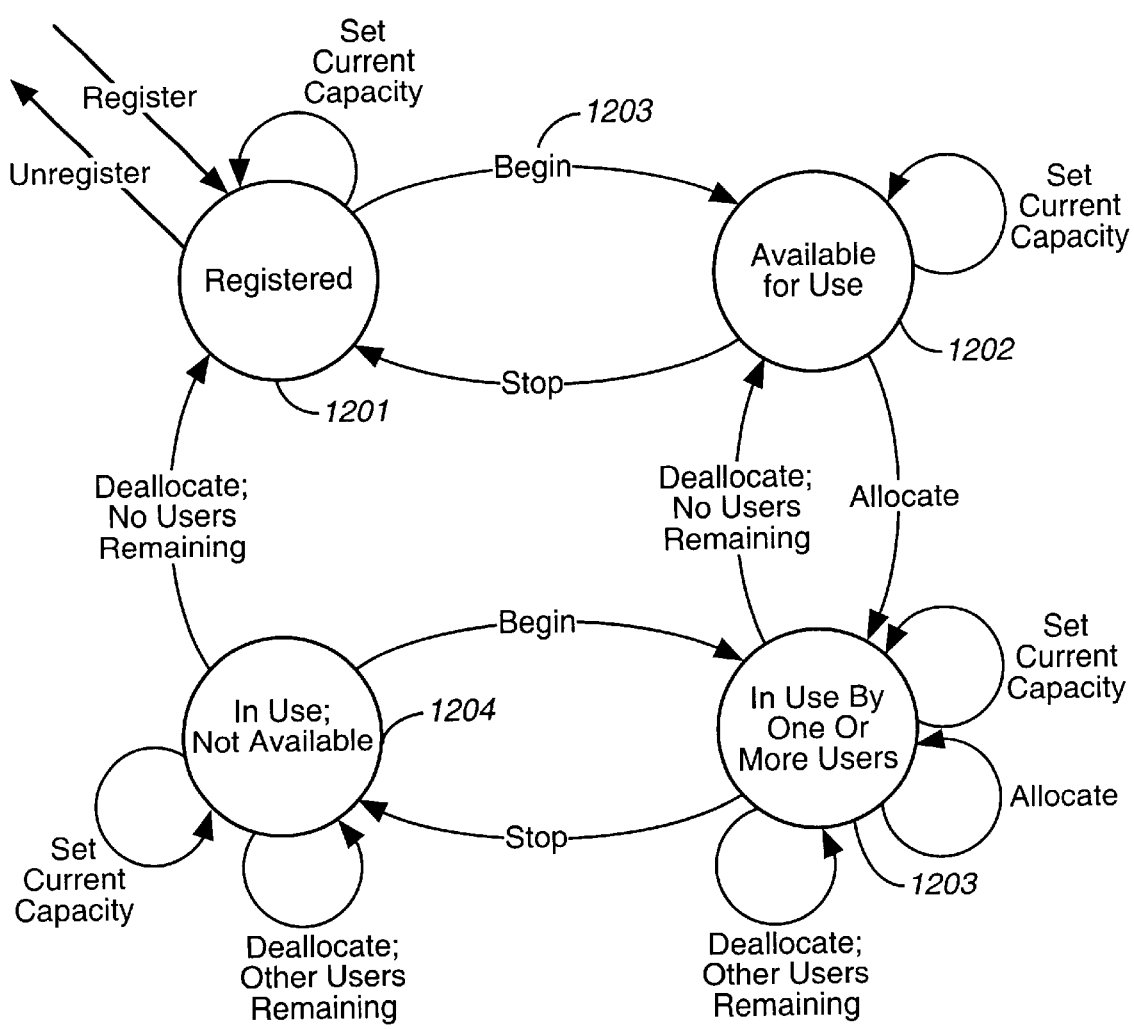
FIG. 12 represents the state transition diagram for a simple resource or a complex subordinate resource.

FIG. 12 represents the state transition diagram for a simple resource or for a complex subordinate resource. Such a resource may have any of the following four states: "Registered" 1201, "Available for Use" 1202, "In Use by One or More Users" 1203, and "In Use—Not Available" 1204. The arrows connecting these four states represent transitions elicited by the performance of RA-API functions listed in FIG. 11 by the RAHS. For example, a call to the function "Begin-Allocating-Resource" will cause a resource in the state "Registered" 1201 to Begin 1203 transition to the state "Available for Use" 1202.

Figure 13:
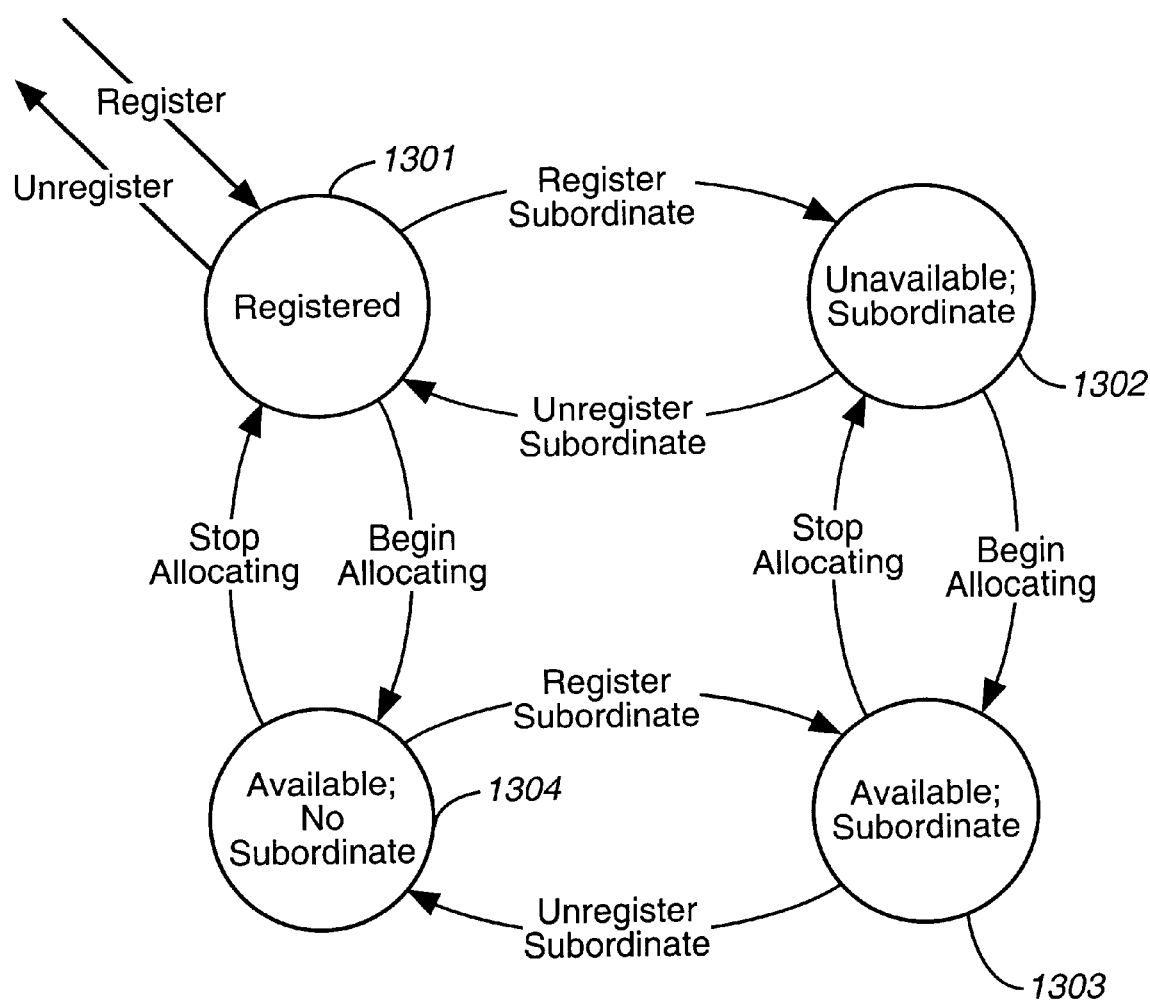
FIG. 13 displays a state transition diagram for a complex superior resource.

FIG. 13 displays a state transition diagram for a complex superior resource. A complex superior resource also has four states: "registered" 1301, "unavailable subordinate" 1302, "available subordinate" 1303, and "available—no subordinate" 1304. As in FIG. 12, state transitions occur when the RAHS executes functions invoked by a user through the RA-API. For example, a complex superior resource that has been registered and is currently in the state "registered" 1301 transitions to the state "unavailable subordinate" 1302 when a user calls the function "Register-Resource" to register a complex subordinate resource that depends on the complex superior resource represented by the state transition diagram.

Figure 14:
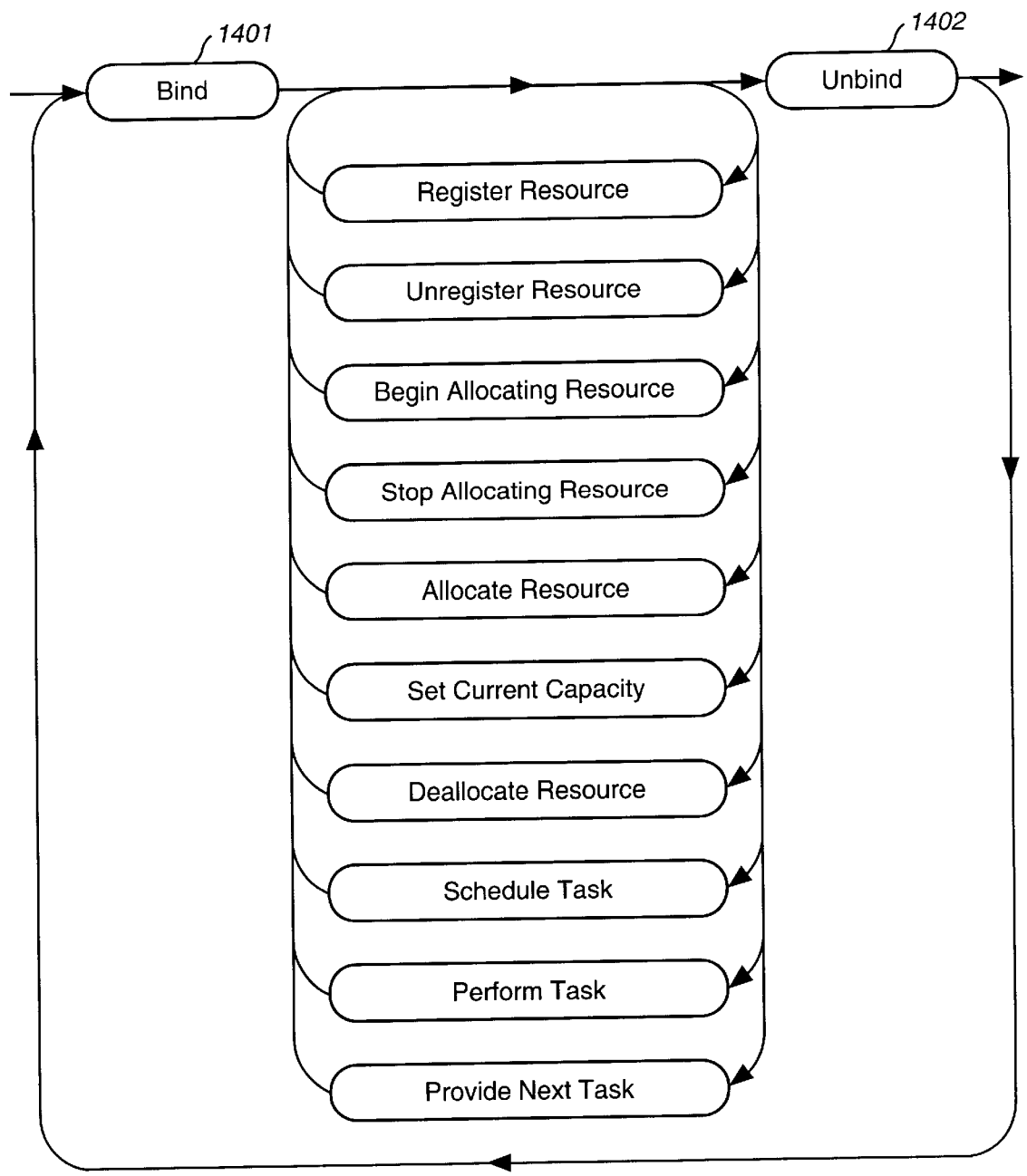
FIG. 14 displays a protocol flow control diagram that describes the resource allocator application programming interface and resource allocation access protocol.

FIG. 14 displays a protocol flow control diagram which shows the orderings of function calls invoked by a user as it establishes a session and makes requests to the RAHS. FIG. 14 indicates that the first function that must be called by a user is the function "Bind" 1401. Subsequently, the user may call any of the remaining ten functions apart from the "Unbind" function. Although these functions may be called in any order, certain of them will return error conditions if they are called prior to calling another of the functions. For example, one cannot call the function "Allocate-Resource" and specify a resource that has not previously been registered through a call by some user to "Register-Resource." When the user has finished allocating and making use of distributed resources, the user calls the function "Unbind" 1402 to terminate the session with the RAHS.

The RA-API functions listed in FIG. 11 will be more fully described below, including the arguments specified when the functions are called. The function "Bind" authenticates a user to the RAHS and, if successfully executed by the RAHS, establishes a session between the user and the RAHS. This established session is the context in which all other RA-API functions are performed. The success of the function "Bind" is dependent upon successful completion of an authentication process. Arguments supplied to Bind include: (1) user credentials; (2) service priority; (3) version; and (4) the user session context. The user credentials argument contains the credentials of the user. These credentials are based on user identification and password protection sufficient for protecting access to a private network. In a public network, more secure authentication credentials are used. The service priority argument specifies the urgency or nonurgency with which the user wants the invoked service to be performed by the RAHS. Possible service priority values are low, medium, and high. The RAHS performs services in order of priority and time of arrival, with the highest priority request performed first. The version argument specifies the version of the services which the user is allowed to use for the session. The user session context is an optional argument that, when present, specifies a context identifier with which the user correlates subsequent activity associated with this session.

Execution of the function "Bind" by the RAHS causes the RAHS to return a result containing the user session context, an RAHS session context, the service priority, RAHS credentials, and a version number. The RAHS session context is a context identifier which the RAHS uses to correlate subsequent activity with the associated session. This returned RAHS session context is paired with the user session context to form a session context, essentially a handle, that identifies the session initiated by the call to Bind. The service priority returned by the RAHS is the service priority elected by the RAHS for the session established by this call to Bind. The version returned by the RAHS is the version of the services which the RAHS supports. Finally, the credentials returned by the RAHS contain the credentials of the RAHS. These credentials are used by the user to authenticate the identity of the RAHS.

The function "Unbind" causes the RAHS to terminate a session previously established by a call to Bind. Arguments supplied to Unbind include a session context and a service priority. The session context is the handle established or returned by a previously executed call to Bind.

The function "Register-Resource" establishes within the RAHS knowledge of a new resource and causes the RAHS to store a resource information object representing the resource into all the separate databases maintained by RASAs within the communications network. Arguments supplied to the function "Register-Resource" include: (1) session context; (2) service priority; (3) resource name; (4) resource class; (5) resource address; (6) unit of allocation; (7) resource capacity; (8) permitted actions; and (9) characteristics. The session context is the session context established during a prior call to the "Bind" function. Service priority is the priority requested by the user for execution of this function. The remaining arguments specify the fields of the resource information object as shown in FIG. 9 and discussed above.

The function "Unregister-Resource" removes a resource identifier object from all the databases maintained by the resource allocator system agents within the communications network. The resource is thus removed from the allocatable resource pool. Parent resources, i.e., complex superior resources, cannot be unregistered until all of the subordinate resources that depend on the parent resource are unregistered. Arguments supplied to Unregister-Resource include: (1) a session context; (2) a service priority; and (3) the name of the resource to be unregistered.

The function "Begin-Allocating-Resource" directs the RAHS to begin allocating a specified resource. Arguments supplied to "Begin-Allocating-Resource" include: (1) a session context; (2) a service priority; and (3) the name of the resource. As discussed above, in the case of a simple resource, successful completion of this function causes a state transition of the resource from the state "registered" to the state "available for use" as shown in FIG. 12.

The function "Stop-Allocating-Resource" terminates allocation of a specified resource. Arguments supplied to "Stop-Allocating-Resource" include: (1) a session context; (2) a service priority; and (3) the name of the resource that the user wishes to no longer be allocated. Execution of this function results in a state transition for the resource, as described in FIG. 12.

The function "Allocate-Resource" represents a request by a user to allocate the specified resource. Argument supplied to Allocate-Resource include: (1) a session context; (2) a service priority; (3) a resource class; (4) max wait duration; (5) request time; and (6) wait priority. The argument "max wait duration" specifies the maximum time which the user will wait for the resource to be allocated. The argument "request time" establishes a time that the user wants the RAHS to use in providing a first-come-first-serve service. The user may use the current date and time or use the date and time at which some higher level context was initiated. The argument "wait priority" establishes the wait priority for allocation of resources for a requested operation. The function "Allocate-Response" returns the address of the allocated resource if it is successfully allocated. This address corresponds to the resource address field of the resource information object 903 in FIG. 9.

The function "Set-Current-Capacity" establishes the remaining capacity of a complex resource. Arguments supplied to Set-Current-Capacity include: (1) a session context; (2) a service priority; (3) a resource name, and (4) a new capacity.

The function "Deallocate-Resource" releases a previously allocated resource and returns it to the pool of unallocated resources. Execution of this function results in a state transition for the resource as described by FIGS. 12 and 13. Arguments supplied to Deallocate-Resource include: (1) a session context; (2) service priority; and (3) the name of the resource to be deallocated.

The function "Schedule-Task" enables a user to enqueue a task to a specified resource. Arguments supplied with this function include: (1) a session context; (2) a service priority; and (3) a function. The argument "function" specifies how the task is to be queued. A task may be queued to a resource class so that the RAHS can determine a particular member of the class to execute the task, or it can be queued to a specific resource identified by the name or by the network address of the resource.

The function "Perform-Task" is called by the RAHS to instruct an allocated resource to perform a scheduled task. Arguments supplied with this function include: (1) a session context; (2) a service priority; and (3) a task ID which identifies a task to be performed. The function "Performs-Task" returns a result which indicates that: (1) the task has been completed; (2) that the task has been rescheduled to be completed by another resource; or (3) that no resource was able to perform the task.

The function "Provide-Next-Task" provides a user or resource with the ability to request from the RAHS another task to perform. In other words, the RAHS maintains a batch of tasks to be performed by this resource and the resource requests tasks from the RAHS one at a time. The result of this function call indicates either that no further tasks are available to perform or that the next task will be sent as a result of a following "Perform-Task" call by made the RAHS to the user or resource.

Figure 15:
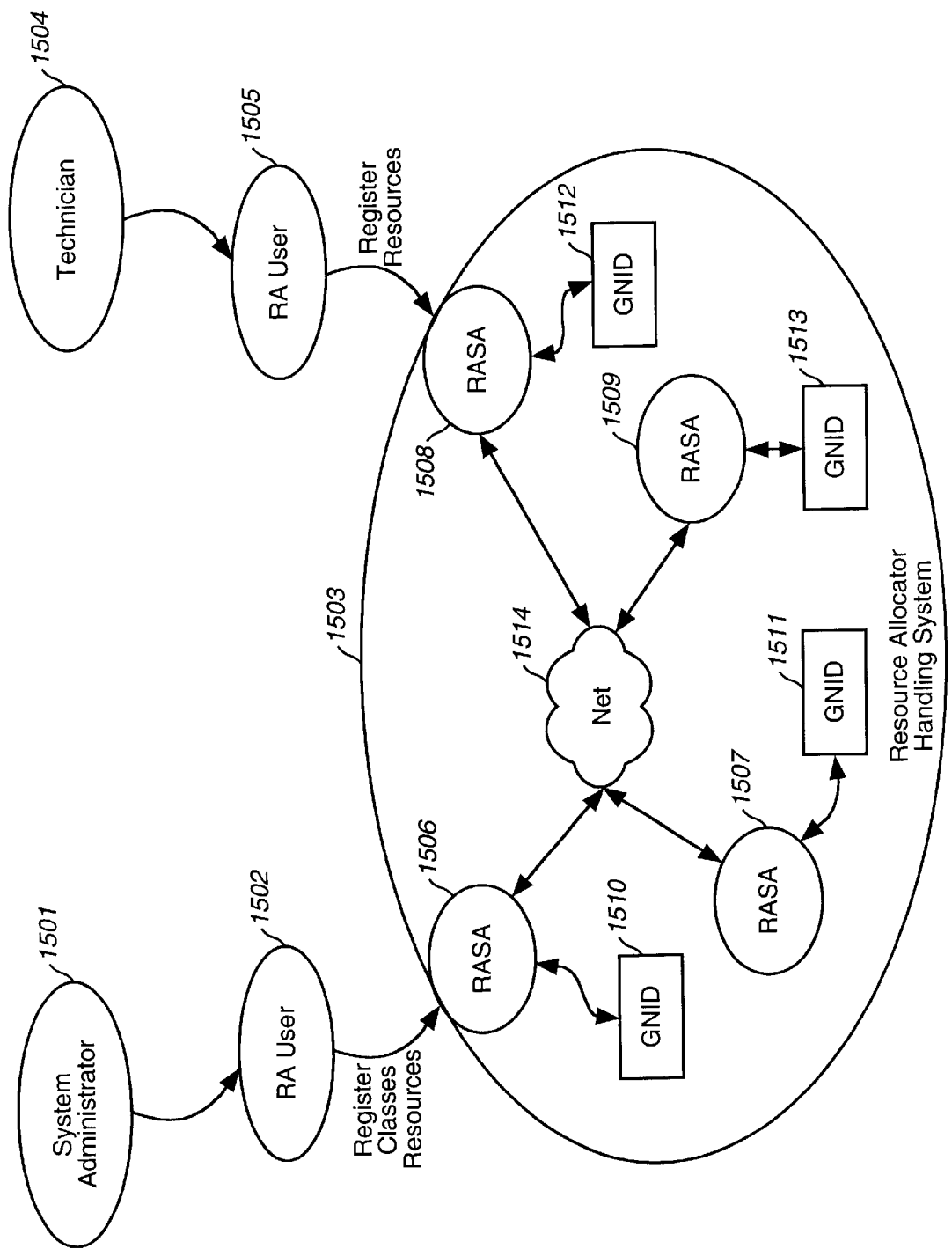
FIG. 15 is a schematic diagram illustrating how new resources and other directory information are entered into the network.

The RAHS includes a capacity for adding new resources to the network, as has been discussed above with regard to the Register-Resource function. FIG. 15 further illustrates how new resources and other directory information are entered into the network.

FIG. 15 shows a system administrator 1501 utilizing an RA user 1502 and a technician 1504 utilizing RA user 1505. Both RA users 1502 and 1505 may send communications to and receive communications from a resource allocator handling system 1503. The resource allocator handling system 1503 includes RASAs 1506–1509, with each RASA having its own GNID. The GNIDs 1510–1513 are respectively associated with a specific RASA 1506–1509. The RASAs communicate over a network 1514 using the sub-systems and protocols previously discussed.

The system administrator 1501 holds greater resource registration privileges than the technician 1504. Accordingly, the RA user 1502 has privileges for registering resources and for registering new resource components, such as new resource classes and characteristics. The technician only has privileges for registering new resources, and the new resource requests submitted through the RA user 1505 may only include previously registered resource components, such as those registered by the system administrator 1501.

The system administrator 1501 and the technician 1504 may add a new resource to the network by providing information such as the class of the resource, a unique name for the resource, the resource's type, how the resource will be managed, an algorithm for allocating the resource's capacity, the resource's characteristics, and information resolving any conflicts between the new resource's definition and the definitions of all previously registered resources. Information describing the new resource must be selected from previously stored resource component information. For example, a new modem's speed could be described by selecting a previously stored resource component representing a particular modem speed. A globally accessible directory (described below) holds the resource component information that is used to describe a new resource. As discussed above with regard to FIG. 9, the new resource's description is stored as a RIO in the GNID.

Figure 16:
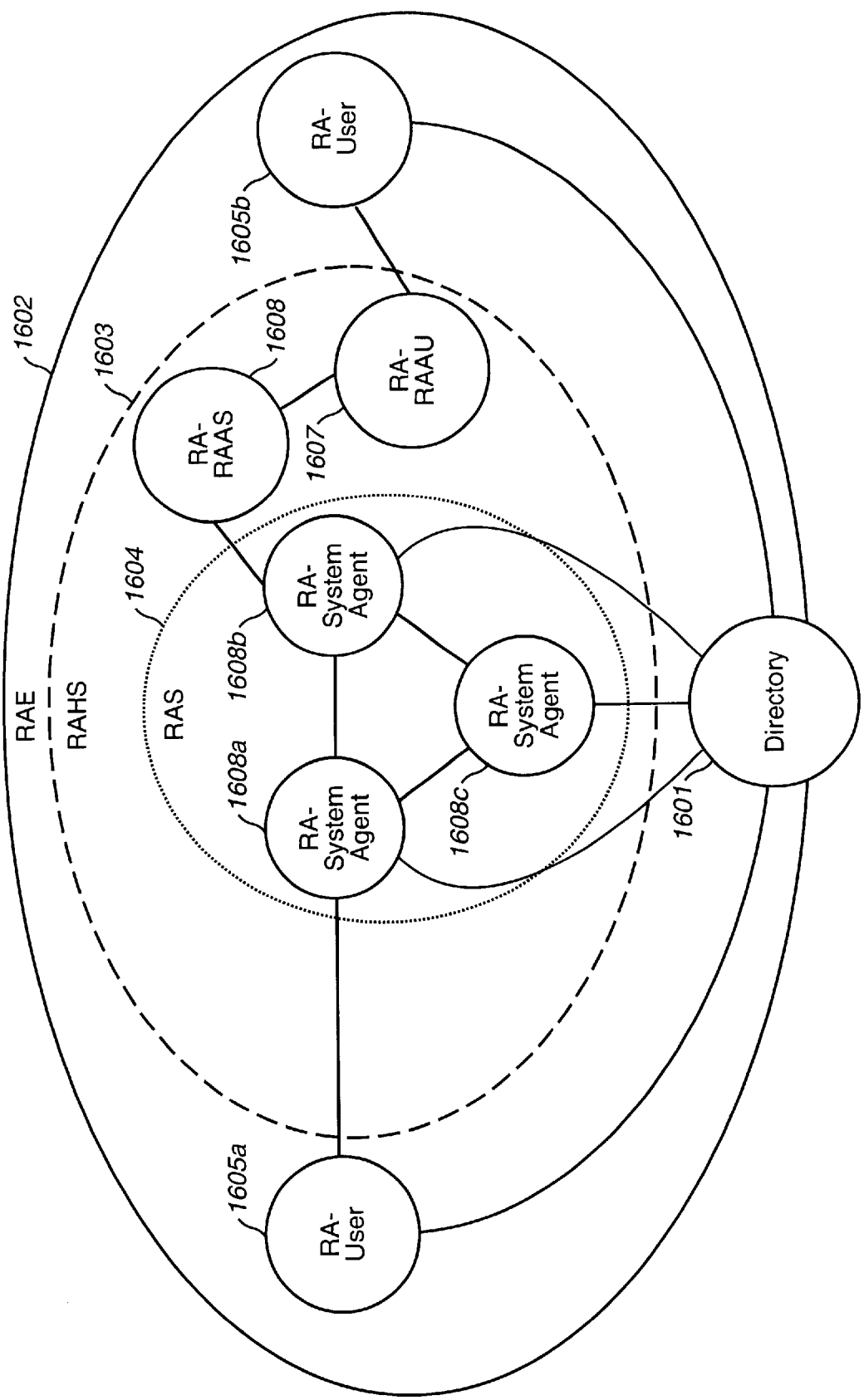
FIG. 16 is a schematic diagram illustrating a globally accessible directory associated with an exemplary embodiment of the invention.

FIG. 16 illustrates a globally accessible directory 1601 associated with the invention. The globally accessible directory 1601 includes definitions for resource components and includes a registration area for entering new resource components. The globally accessible directory 1601 is accessible by all elements within a Resource Allocator Environment (RAE) 1602. The RAE 1602 encompasses a RAHS 1603 and two RA users 1605a and 1605b. The RAHS 1603 encompasses a Resource Allocator System (RAS) 1604 and RA-RAAS 1606 and RA-RAAU 1607. The RAS 1604 includes three RASAs 1608a–1608c.

The directory 1601 is designed as a tree structure, and the registration area for new resource components resides in a particular portion of the directory tree. Personnel having appropriate clearances, such as the system administrator 1501, may register new resource components such as classes and attributes and store them in branches of the directory tree. This process makes resources available throughout the network, including the RAHS 1603 and the RA-Users 1605.

A given RASA uses the directory tree to locate classes and attributes while performing tasks such as adding a new resource. The directory tree also includes a description of the network's resources that may be used to populate the RIOs of the GNIDs within the network upon start-up, according to one embodiment of the invention. The directory tree also includes the RA schema that defines the rules and constraints concerning object class definitions, attribute definitions, and the attribute syntax definitions that collectively characterize the network's resources. The resource classes, attributes and the resources themselves are entered into the directory 1601 using a web browser-type interface that directs the registration of new information.

The registration system enforces a unique naming convention that prohibits duplicate names from being entered for resources and resource component information. If a request is made to create a new resource characteristic, for example, but this new characteristic would be given the name of an existing characteristic, then the registration system will not allow registration of the new characteristic. In one exemplary embodiment of the invention, the directory reduces the characteristics list in order to place all similar characteristics under the same description.

The unique naming convention required by the network utilizes the relative distinguished name of a resource, or resource-RDN, which is recorded in the registry of resource names in the directory, according to an embodiment of the invention. The resource-RDN uniquely and unambiguously identifies the resource and is comprised of three parts: the identities of the domain, the locality, and the name of the resource. The domain refers to the particular resource allocator system in which the resource will be placed. The locality refers to the particular RASA to which the resource will be affiliated. The name of the resource may be any unique text field and in many instances will be a short descriptive name, such as "Accounting's Printer." The directory may derive the resource-RDN from the listing of the names of entries in the directory. A resource must also belong to one class and only one class. The resource class identifies the class of resources of which a particular resource is a member, such as the class "modem." If additional class refinements are needed for the resource, the resource characteristics may be used to specify the sub-classes to which a given resource belongs.

In some instances, a system administrator may desire a different resource class for identical equipment. For example, the same type of resource may be used by RA users in two different areas. By giving each group of RA users a different resource class, the system administrator can simplify the entry of new resources for each of the areas. The location of the resources and information regarding the resources are included in the directory tree and its subtrees. The directory 1601 provides an area that specifies exactly what the resource is and includes a definition of the resource, including its physical location. Thus, not only does the directory 1601 provide a description of a resource's logical location within the network, but the directory also provides a description of the resource's physical location.

The RAHS 1603 provides a registration capability for entering new resources into the network, including the directory 1601. The RA-AP register resource service establishes a new resource and stores the name of that resource into the RAHS database, the GNIDs, making it available for use throughout the network. Any RA user with the privilege to register resources may register any resource, according to one exemplary embodiment of the invention.

The global directory, such as the directory 1601 shown in FIG. 16, comprises a suitable database for storing data regarding the components that describe all of the resources in a large distributed network. For example, the directory 1601 may be either a single centralized system or a distributed system. One exemplary embodiment of present invention does not limit or further circumscribe the capabilities or arrangement of the global directory beyond the definitions provided in the ITU-T recommendation X.500, which is incorporated by reference. A given RASA has sufficient knowledge to access the directory and sufficient knowledge to read an entry from the directory. RA-users may use the directory to map a constant name to a list of preferred RASAs for accessing the RAHS, according to one exemplary embodiment of the invention.

Figure 17:
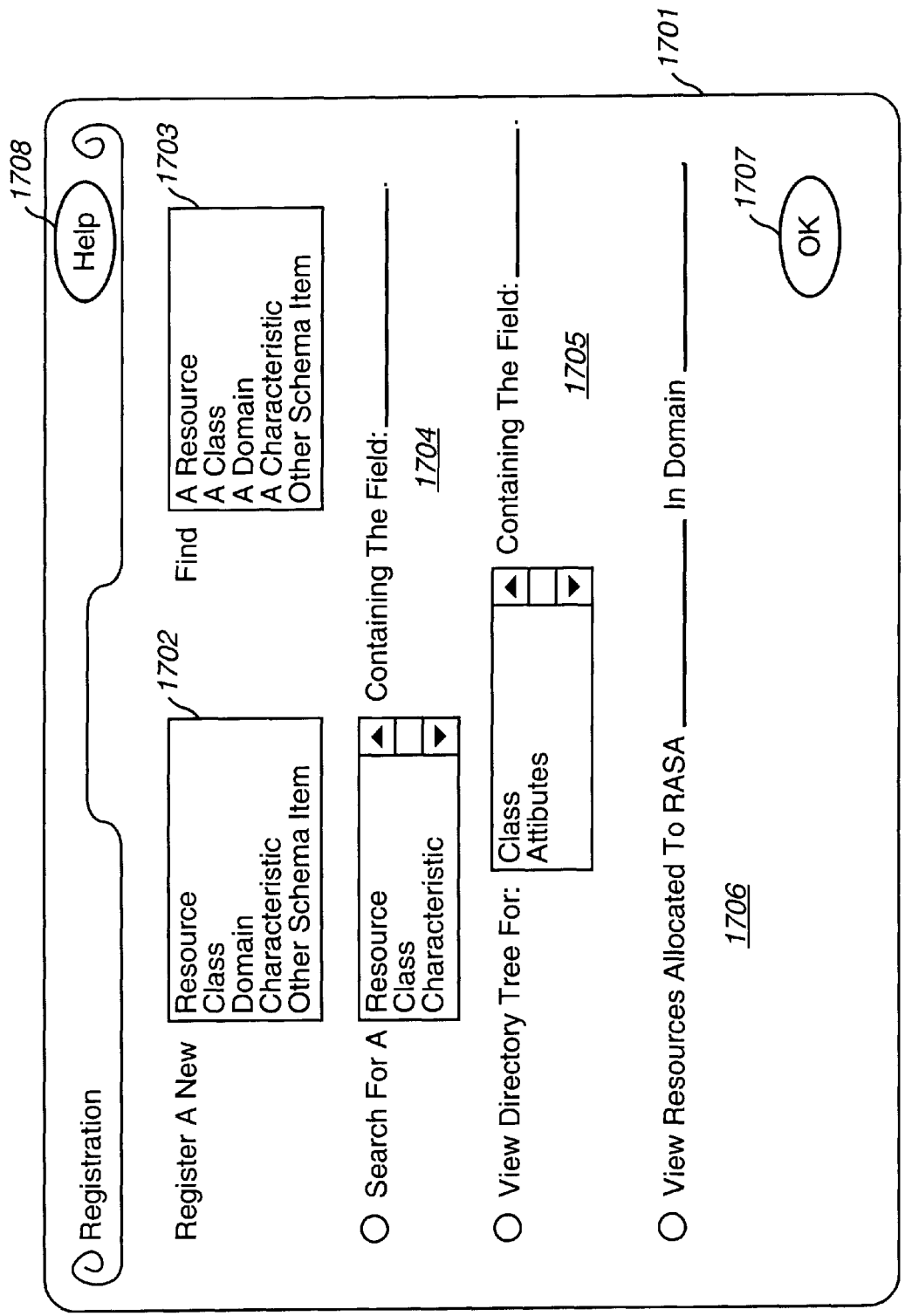
FIG. 17 is a front elevational view of a computer screen showing an exemplary user interface that may be used for registering new resource component information.

FIG. 17 illustrates a user interface that may be used for registering new resources and new resource components such as classes, domains, and characteristics. User interface 1701 may be accessed by an RA user having privileges such as the RA user 1502 shown in FIG. 15. A system administrator, such as the system administrator 1501 shown in FIG. 15, uses the user interface 1701 to register new resources and resource component information. The user interface 1701 includes a capacity for registering a new resource class, domain, characteristic, or other directory schema item using registration field 1702. In operation, a system administrator selects a resource item from the list provided in the registration field 1702. Having selected a resource item, the system administrator then initiates the registration process by actuating a displayed button 1707. The system administrator may also find information about previously stored resources and resource components using find area 1703.

Alternately, the system administrator may search for a particular item using a search field 1704. The search field 1704 allows the system administrator to first select a particular resource or resource component, such as a resource or a class or a characteristic, and then enter other descriptive information to narrow the focus of the search. The system administrator may also view information regarding resources allocated to a particular RASA using view resources area 1706. This area allows the system administrator to enter the name of a particular RASA in a specified domain and then find information regarding resources assigned to that domain. The system administrator may receive help in conducting the registration and information retrieval function by actuating a displayed help button 1708.

Figure 18:
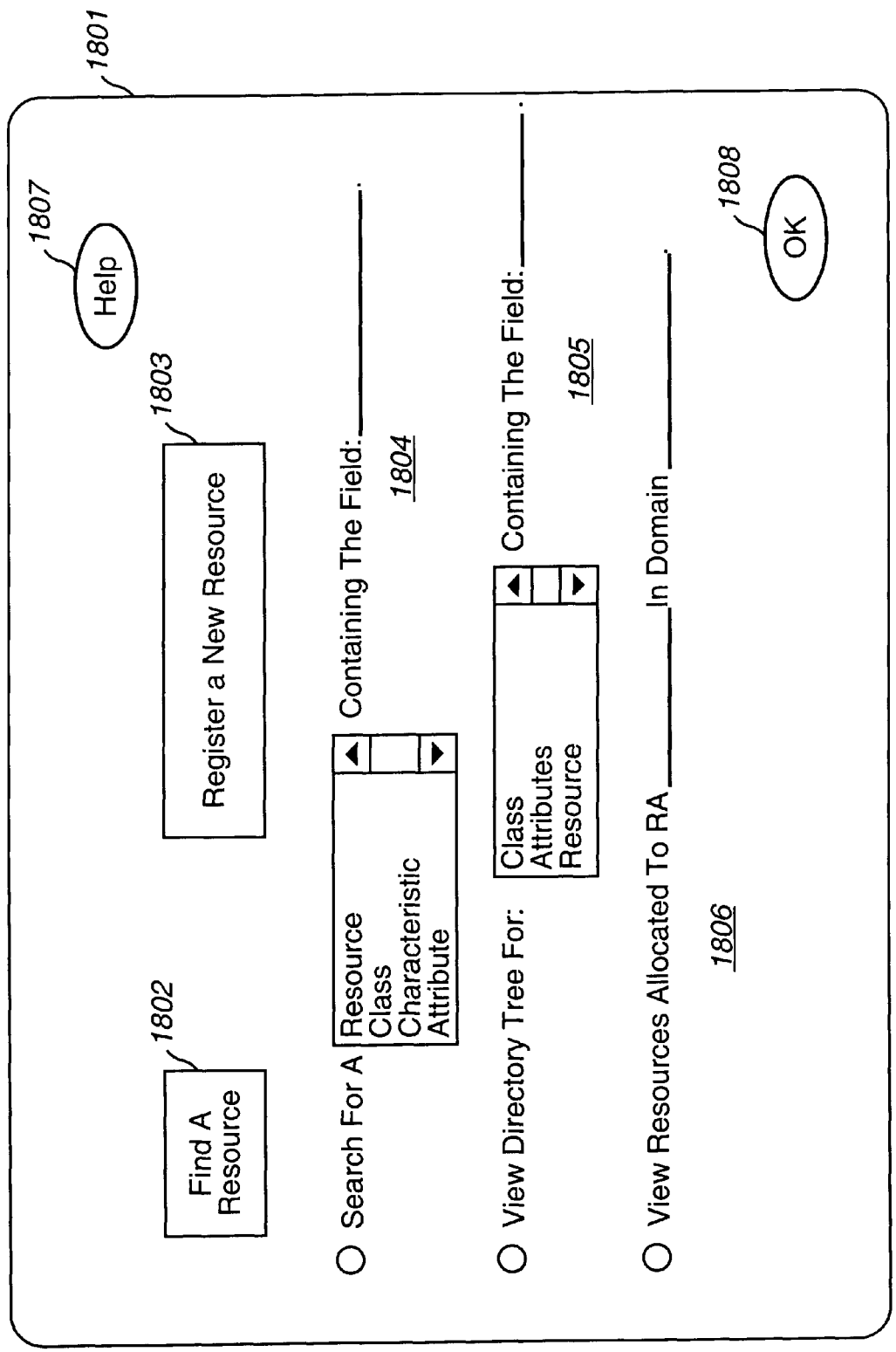
FIG. 18 is a front elevational view of a computer screen showing an exemplary user interface that may be used to find information about previously registered resources and to initiate the registration of new resources.

FIG. 18 illustrates a user interface 1801 that may be used by a technician, such as the technician 1504 shown in FIG. 15, for the registration of new resources and for finding information regarding resources classes and other characteristics. A technician accessing the user interface screen 1801 has fewer privileges than a system administrator accessing the user interface screen 1701. The user interface 1801 is similar to the user interface 1701 of FIG. 7. The technician may initiate a procedure for finding a resource by actuating a "find a resource" button 1802. The technician may register a new resource by actuating a registration button 1803. The technician then enters the resource component information that describes the new resource in accordance with the previously described Register-Resource function. An exemplary embodiment of a user interface for the entry of new resources, such as that activated by the registration button 1803, is discussed below with regard to FIG. 20.

The technician may initiate a search of previously stored resources and resource components using a search field 1804. The technician initiates a search in the search field 1804, selecting a resource class attribute or other resource characteristic, and then entering additional information about the resource for which information is sought.

The technician may view information regarding the directory tree using a directory view area 1805. The technician actuates a radio button adjacent to the view field in the view area 1805, selects a particular directory tree item, such as a resource class, and then enters information regarding the field in order to initiate a search of the directory tree.

The technician may view information regarding resources assigned to a particular RASA using view field 1806. The technician actuates the radio button next to the view resources field, then enters a particular RASA and a domain name which contains the RASA.

When the technician has completed entry of information in the required fields for any of the commands, the technician may then engage a subsequent search by actuating button 1808. The technician may receive help for conducting any of the above operations by using a help button 1807.

Figure 19A:
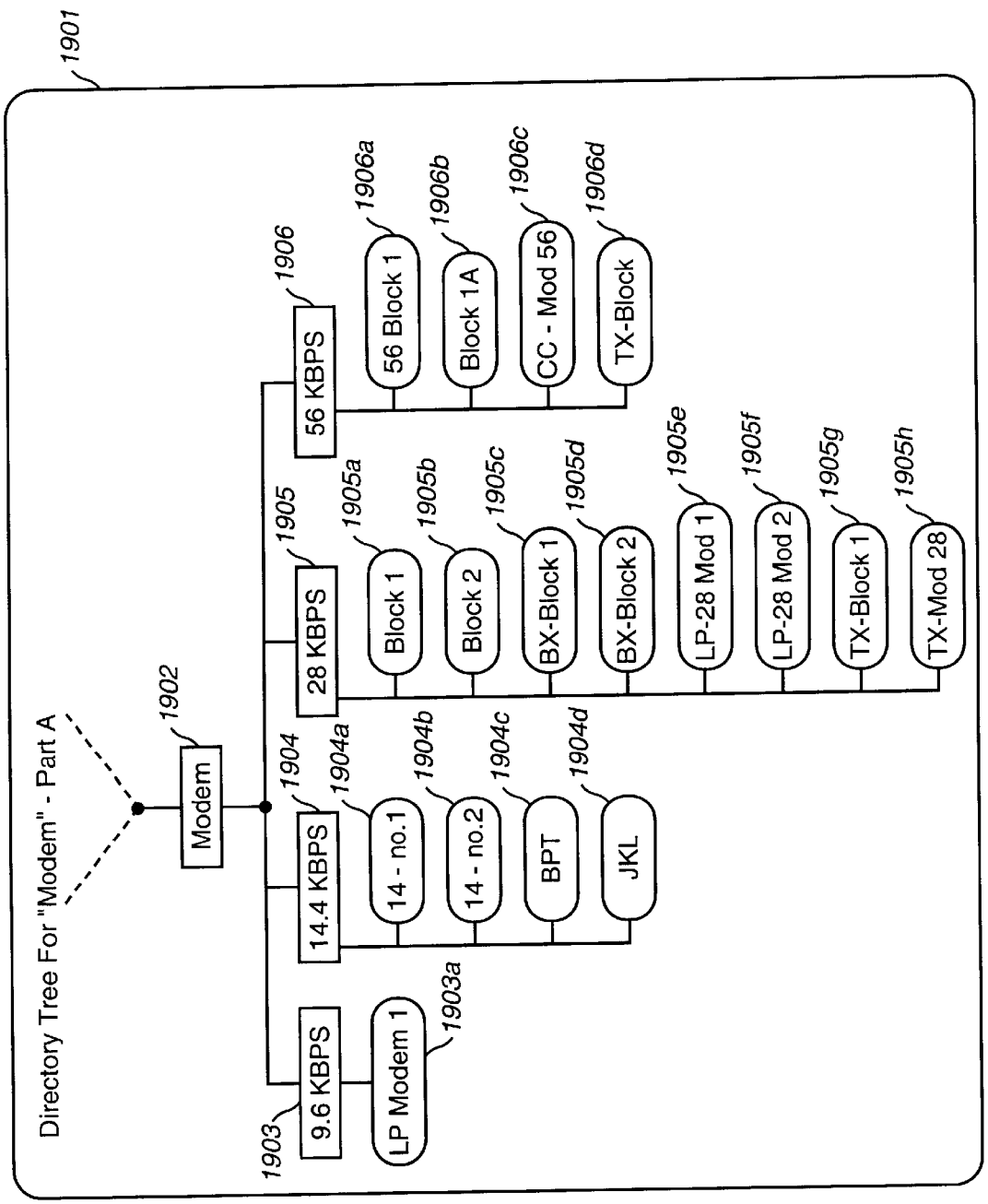
FIGS. 19A and 19B illustrate a portion of an exemplary directory tree structure, according to an exemplary embodiment of the invention.
Figure 19B:
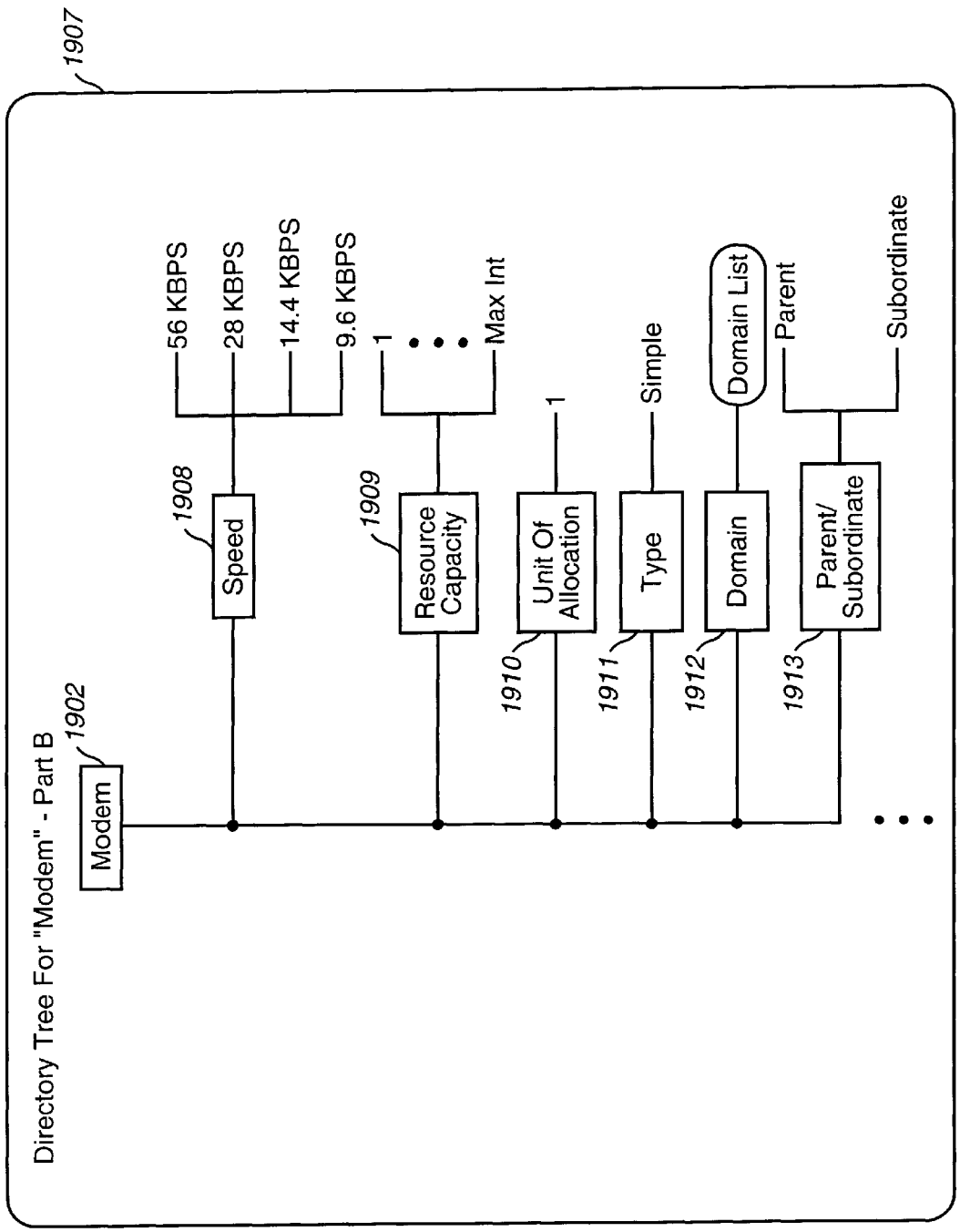

FIGS. 19A and 19B illustrate a portion of the directory tree for a class named "modem." Using the user interface 1801 of FIG. 18, a technician may view the portion of the directory tree search field 1805 containing the class "modem." The view of the directory tree includes two parts, class data and component data, according to an exemplary embodiment of the invention. Directory screen 1901 shows modem class data 1902. The modem class data 1902 describes actual modem resources and may be used to populate the RIOs of the GNIDs within the network upon start-up, for example. The modem class data 1902 comprises modems of four subclasses 1903–1906. Each of the subclasses represents modems of particular capabilities. For example, the subclass 1905 represents 28 Kbps modems. Following each subclass is a list of the modems in the directory tree of that respective subclass. The 28 Kbps subclass 1905 comprises modems 1905a–1905h, which are typically listed in alphabetical order. The modem resources in subclass 1905 represent both individual modems and blocks of modems. For example, block 1 1905a includes more than one modem, while modem LP-28MOD1 1905e represents only a single modem. When establishing a resource, the technician or system administrator has considerable freedom in how the resource is registered in the directory and in the GNID.

FIG. 19B illustrates resource components within the modem class 1902. These resource components represent the items that may be selected by a user, such as a technician or a system administrator, when establishing a new resource. For example, speed characteristic 1908 provides the technician with the options 56 Kbps, 28 Kbps, 14.4 Kbps and 9.6 Kbps. When establishing a speed for a new modem, these are the only choices that will be available in order for a resource to be properly registered. However, this list may either grow or decrease if a system administrator, having the proper access privileges, modifies the speed characteristic 1908. For example, a system administrator could modify the speed characteristic 1908 to include a 4.8 Kbps characteristic.

As discussed with regard to FIG. 19A, a modem in the directory's resource tree may either be a single modem or a block of modems. Resource capacity 1909 allows entry of the number of items included in the new resource. For example, the resource capacity 1909 includes the choices ranging from 1 to the maximum integer (MAXINT) for the computing system hosting the application. Thus, a technician could indicate a modem block by setting the resource capacity 1909 to a number such as "6" that would be indicative of six modems.

The unit of allocation field 1910 indicates the amount by which a resource's capacity will be diminished each time the resource is seized by an RA user. As shown in FIG. 19B, the modem class 1902 has been established such that the unit of allocation 1910 for all modems is 1. This means that the modem's capacity diminishes by 1 every time the RASA allocates a modem to a requesting RA user. Thus, for a block of modems, each access will reduce the available capacity by 1. For a single modem, decreasing its capacity by 1 will simply use all of the resource's capacity and close the resource to other requesters until the RA user releases the modem.

Type field 1911 provides an indication of whether the resource is simple or complex, as previously defined. In the case of a modem, the resource is simple. Thus, the type 1911 only allows "simple" to be entered. Domain field 1912 is keyed to a list of all of the domains within the RAHS. Thus, when entering a new resource, the technician will have available a complete list of all of the domains within the RAHS. "Parent/Subordinate" field 1913 allows entry of an indication of whether the new resource will be a parent resource or a subordinate resource. For example, in the case of a modem block, the modem block will comprise a parent modem and any number of subordinate modems.

FIG. 20 provides an example of a user interface that would be provided to a technician or system administrator for the entry of a new resource. The user interface 2001 establishes the entry of a new resource based upon the existing class and schema information presently stored in the directory tree. The technician enters a resource name in a name field 2002. Since the RAHS enforces a unique naming scheme, the technician may wish to reference a list of existing names and may do so by actuating an "existing names" button 2016. The technician may select a resource class for the resource using the pull down list of existing resource classes in field 2003. The technician may specify a resource domain for the new resource by making a selection from the pull down menu shown in a resource domain field 2004. The technician may create a logical address for the new resource by entering a logical address in field 2005. Corresponding to the logical name field 2005 is an "existing addresses" button that when actuated provides a list of the existing logical addresses stored in the directory tree.

The technician may enter an actual physical location for the new resource in a field 2006. The technician may reference a list of existing locations stored in the directory tree by actuating a corresponding button labeled "existing locations." The display of information in the display of existing locations may be copied and pasted into the resource physical location 2006, according to one exemplary embodiment of the invention.

A technician enters a unit of allocation for the new resource by selecting a number in a pull down menu 2007. The technician selects a resource capacity for the new resource using pull down menu 2008. The choices provided by the pull down menus, such as pull down menus 2007 and 2008, are based upon information stored previously in the directory tree. The technician indicates whether the new resource is a parent or a subordinate using the pull down menu provided in field 2009. The technician indicates whether the resource is simple or complex by selecting one of these choices in field 2010. As previously discussed, the resource class may predetermine the choice of simple or complex for some resources, and a selection will already be made for the technician. The technician selects permitted actions for the new resource by selecting from a list of permitted actions provided in field 2011. The technician selects one or more resource characteristics for the new resource from a pull down menu 2012. The range of possible resource characteristics will already exist in the directory tree, and the technician merely selects from the choices provided. The entry of new characteristics typically requires a higher authorization level, and is performed by supervisory personnel, as previously discussed.

Once the technician has entered information for the new resource, the technician may elect to verify the internal consistency of the selected choices by actuating a verify button 2013. The verify button 2013 compares the technician's selections for the new resource against the information already entered into the is directory tree for resources of that selected class. For example, in the case of a modem class, the technician may have selected an improper unit of allocation or entered an improper list of permitted actions, as well as other possible errors. The verify procedure analyzes the technician's choices for the new resource and indicates whether such choices will be allowed. The technician may then change appropriate fields for the new resource using the information provided from the verification procedure. The user interface also provides the technician with an automated help wizard that may aid in diagnosing inconsistencies with the new resource's entries. In addition to the help wizard previously discussed, the technician may actuate help button 2015 at any time to receive help regarding completion of the user interface 2001, or any of its fields, or for help in interpreting information provided during the verification procedure. When the technician is satisfied that the new resource has been properly described, then the technician actuates a submit button 2014 which sends the new resource request to the directory tree. The directory performs another verification process, and if the verification succeeds, then the new resource is entered into the directory tree.

The registration and user interface shown in FIG. 20 operates in conjunction with the "Register-Resource" function previously discussed. A technician's selections in the user interface result in the formation of a register-resource function argument that is then sent to the RA user's RASA for processing. The RASA processes the arguments in the RA user's register resource function command and actually performs the entry of the new resource into the directory. As previously discussed, arguments included in a register resource function include: (1) session context; (2) service priority; (3) resource name; (4) resource class; (5) resource address; (6) unit of allocation; (7) resource capacity; (8) permitted actions; and (9) characteristics. Through this process, new resources are entered into the RAHS. The entry of new classes and the other constituent components of a resource are entered in a like manner as has been discussed.

Directory access for the entry of classes and resources is restricted to users having appropriate identification. The directory authenticates the user's identification before providing access to the registration area. The RA users may also use the global directory to authenticate a RASA in order to complete the binding between the RA user and the RASA. The RASA uses the global directory to authenticate the RA user in order to complete the binding between an RA user and the RASA. Each RASA also uses the global directory to store a profile of the default values used in providing services to RA users.

The access network between the RA users and the RAHS is private. Since there is no public access, this portion of the system is not subject to the same security threats as a public network. As a private network, the RAHS may utilize a simple or weak authentication scheme for the RA users and the RAHS, according to one embodiment of the invention. The simple authentication scheme is based on identification and passwords. Each RA user and the RAHS has a name and a password. The name is used as the identity of an entry in the directory. Authentication consists of two parts: the RAHS authenticating the RA user and the RA user authenticating the RAHS.

Figure 21:
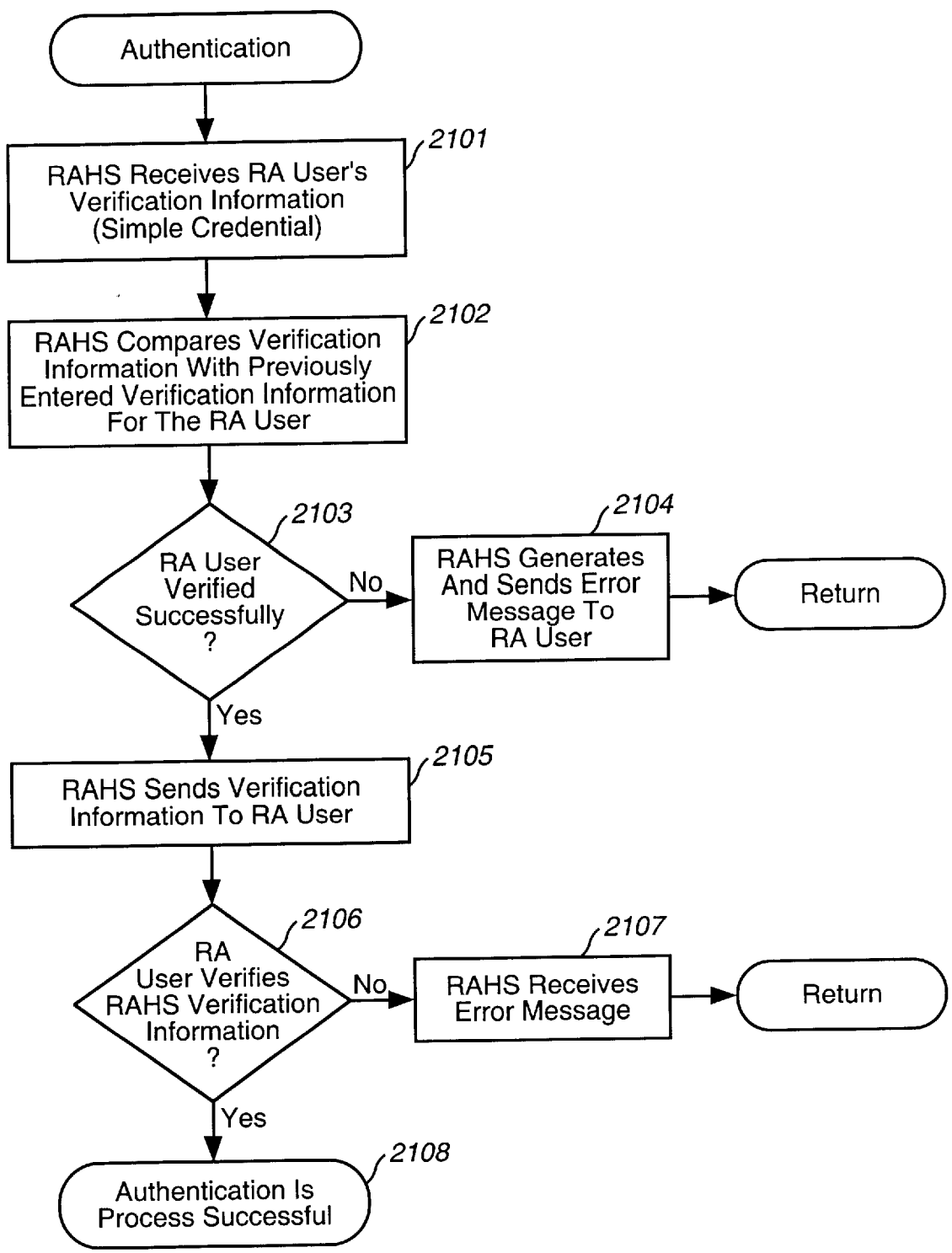
FIG. 21 is a flowchart illustrating the authentication procedure between RA users and the RAHS.

FIG. 21 provides a flowchart illustrating the authentication procedure. For the RAHS to authenticate the RA user, the owner of the directory entry, reads its own password from the entry and with its name forms verification information, a simple credential, that is passed as an argument in the previously discussed API-Bind function. The RAHS receives the verification information (step 2101) and compares the received verification information with the verification information previously stored for the RA user in the directory (step 2102). If RAHS cannot verify the RA user (step 2103), then the RAHS generates and sends an error message to the RA user (step 2104). If the comparison is positive (step 2103), authentication is considered successful, and the RAHS returns a Bind result. When the RAHS returns the Bind result, the RAHS also sends verification information to the RA user (step 2105). The verification is typically compiled by a RASA that reads from its directory its own password and with its own name forms the verification credentials. The RA user then asks the directory to compare the received password against the password in the RASA's entry. If the RA user cannot verify the RAHS, then the RAHS receives an error message from the RA user (step 2107). If the comparison is positive, then the authentication process has succeeded (step 2108). The RAHS does not receive notice of the RA user's successful verification, according to one embodiment of the invention.

While the present invention has been described with reference to a preferred embodiment thereof, those skilled in the art will appreciate that various changes in form and detail may be made without departing from the intended scope of the present invention as defined in the appended claims. For example, the RASAs may differ from those shown in the figures. The directory's actual connections with the components of the RAE may differ from the functional description described above. The directory may have a different structure than the tree structure disclosed herein, and if when the directory is organized in a tree structure, the structure may differ from that disclosed herein. Moreover, the directory may even be comprised of microcode provided in various pieces of hardware equipment, provided that the collective operation of the components of the directory operate in the manner that has been described. In addition, the RAHS may be run on different types of computing systems or on computing systems differing substantially from the computing network provided herein.

In one exemplary embodiment, the RAHS and the directory are designed to be compliant with the Telecommunications Management Network (TMN), a set of standards used by network management systems. The TMN provides a network management model defined in International Telecommunications Union Telecommunications (ITU-T) recommendation M.30 and related recommendations. The TMN is intended to form a standard basis for management of advanced networks such as Synchronous Digital Hierarchy (SDH) for fiber-optics in LAN lines and Global System for Mobile communications (GSM) in the cellular communications arts. The TMN specifies a set of standard functions with standard interfaces and makes use of a management network which is separate and distinct from the information transmission network. The TMN also specifies standard network protocols such as the Open Systems Integration Common Management Information Protocol (OSI CMIP). The TMN provides a network management standard which seeks to provide information technology, business and network service management in multi-domain environments.

Further aspects of the invention are described in the following copending patent applications, each of which are assigned to a common assignee: U.S. application Ser. No. 09/365,635, "Method and System for Contention Controlled Data Exchange in Distributed Network-Based Resource Allocation," filed on Aug. 3, 1999, and U.S. application Ser. No. 09/365,631, "Method and System for Load-Balanced Data Exchange in Distributed Network-Based Resource Allocation," filed Aug. 3, 1999. All of the above U.S. patents and applications are incorporated by reference.

Although specific embodiments of, and examples for, the invention are described herein for illustrative purposes, various equivalent modifications are possible within the scope of the invention, as will be recognized by those skilled in the relevant art. The teachings provided herein of the invention can be applied to other distributed resource allocation handling systems, not necessarily the exemplary distributed resource allocation handling system described above. Various exemplary computing systems, and accordingly, various other system configurations can be employed under the invention.

The embodiments of the invention disclosed herein have been discussed with regard to computerized network installations, such as those using large centralized computing systems. However, the invention finds equal applicability in other computing systems, such as small, portable computerized systems and even hand-held computing devices. The invention also finds applicability in a network of telecommunications devices, such as a network of telephones that both send and receive electronic mail as well as voice and data communications.

These and other changes may be made to the invention in light of the above detailed description. In general, in the following claims, the terms used should not be construed to limit the invention to the specific embodiments disclosed in the specification and the claims, but should be construed to include all distributed resource allocation systems that operate under the claims. Accordingly, the invention is not limited by the disclosure, but instead its scope is to be determined entirely by the following claims.

We claim:

1. In a computer network, a distributed resource allocation handling system having a plurality of resources operating across a plurality of domains within the computer network, comprising:

a resource allocator that receives a request to add a new resource to the plurality of resources in the distributed resource allocation handling system;

a resource database comprising data regarding the plurality of resources in the distributed resource allocation handling system;

a global directory of resource data; and a resource verifier that examines the new resource request to determine if the new resource request includes resource data matching resource data in the global directory and that examines the new resource request for compatibility with the plurality of resources in the resource database.

2. The system recited in claim 1 wherein the global directory of resource data is organized in a tree structure with branches of the tree structure representing resource classes, and wherein the resource verifier examines the tree structure of the global directory to determine whether the resource class of the new resource request matches a resource class in the tree structure.

3. The system recited in claim 1 wherein the resource verifier accepts the new resource request only if resource components of the new resource request corresponds to resource components in the global directory.

4. The system recited in claim 1, further comprising an automated help wizard that sends help directions to an application program corresponding to a type of resource for which registration has been attempted by the application program.

5. The system recited in claim 1 wherein each resource of the plurality of resources has a unique name that includes a domain of the resource and a location of the resource, and wherein the resource verifier determines whether a name associated with the new resource request will be unique with respect to plurality of resources.

6. The system recited in claim 1 wherein the resource allocator receives the new resource request from an application programming interface communicating with the resource allocator.

7. The system recited in claim 1 wherein the resource database comprises a network of databases distributed throughout the computer network, and wherein more than one description of the plurality of resources is included in the database network.

8. The system recited in claim 1, further comprising a resource component registry that allows entry of new resource components in the global directory.

9. The system recited in claim 1 wherein the global directory of resource components includes resource classes and resource characteristics, and further comprising a resource component registry that allows entry of new resource classes and resource characteristics in the global directory.

10. The system recited in claim 1 wherein the global directory of resource components includes resource classes and resource characteristics, and further comprising:
   a resource component registry that allows entry of new resource classes and resource characteristics in the global directory; and
   a security checker that provides authorization for the entry of new resource components in the global directory.

11. The system recited in claim 1 wherein the global directory of resource components also includes a database schema for the resource database.

12. The system recited in claim 1 wherein the global directory of resource components includes a database schema for the resource database, further comprising:
   a resource component registry that allows entry of new resource components in the global directory; and
   a schema modifier that allows entry of modifications to the database schema in the global directory.

13. The system recited in claim 1 wherein the resource allocator receives the new resource request as a Register-Resource function from an application programming interface communicating with the resource allocator, wherein the Register-Resource function includes session context, service priority, resource name, resource class, resource address, unit of allocation, resource capacity, permitted actions; and characteristics for the new resource request.

14. The system recited in claim 1, further comprising an application programming interface to an application program that interfaces with the resource allocator, wherein the application program interface includes an Allocate-Resource function that causes the resource allocator to allocate a resource to the application program.

15. The system recited in claim 1, further comprising an application programming interface that provides functions that are called by an application program and executed by the resource allocator, including functions that allocate, deallocate, and make use of the plurality of resources.

16. The system recited in claim 1 wherein the resource database categorizes and describes each resource of the plurality of resources as being a member of one of two categories that include task-oriented and interaction-oriented resources, a task-oriented resource accepting and executing tasks assigned to it without needing additional interaction with an application program assigning the task, and an interaction-oriented resource requiring a dialogue or interaction with an application program in order to complete a task.

17. The system recited in claim 1 wherein the resource database describes each resource of the plurality of resources as having a total capacity for handling a maximum number of tasks or dialogues and a remaining capacity that identifies that portion of the total capacity that has not been allocated to application programs through calls to an application programming interface.

18. The system recited in claim 1, further comprising a flow control and data transmission interface both between an application program and the resource allocator that coordinates use of the plurality of resources by the application program and between components of the resource allocator, wherein the components of the resource allocator include resource allocator systems that execute functions called by the application program.

19. The system recited in claim 1, further comprising a resource allocator user agent associated with the resource allocator that transfers function calls from application programs running on one computer over the computer network, and a resource allocator system agent transfers resource request received over the computer network from the resource allocator user agent to the resource allocator for execution on a resource.

20. The system recited in claim 1, further comprising an application programming interface to an application program that interfaces with the resource allocator and includes a Set-Current-Capacity function that causes the resource allocator to set a remaining capacity description stored in the resource database for a resource indicated by arguments to the Set-Current-Capacity function to a particular value indicated by an argument to the Set-Current-Capacity function.

21. The system recited in claim 1, further comprising an application programming interface to an application program that interfaces with the resource allocator and includes a Schedule-Task function that causes the resource allocator to schedule a task, indicated by an argument to the Schedule-Task function, to a resource indicated by an argument to the Schedule-Task function.

22. The system recited in claim 1, further comprising an application programming interface to an application program that interfaces with the resource allocator, wherein the application program interface includes a Bind function that causes the resource allocator to establish a session with the application program, a handle indicating the established session returned to the application program by the resource allocator as a result of successfully executing the Bind function, wherein the established session provides to the application program a context in which to make subsequent function calls to the distributed resource allocator handling system.

23. In a computer network, a distributed resource allocation handling system having a plurality of resources operating across a plurality of domains within the computer network that assigns the plurality of resources, comprising:
a global network information database that describes the state of the network;
a plurality of resource allocator system agents that maintain the global network information database; and
a resource allocator system protocol that operates between the plurality of resource allocator system agents and allows a resource allocator system agent to inform the plurality of resource allocator system agents that a resource of the plurality of resources has been allocated to an application program.

24. The distributed resource allocation handling system of claim 23 wherein the global network information database includes a description of each resource of the plurality of resources.

25. The distributed resource allocation handling system of claim 23 wherein the global network information database comprises a plurality of databases that each include a description of each resource of the plurality of resources.

26. A computer network that interconnects computer resources and application programs, comprising:
a distributed resource allocator handling system, comprising:
resource allocator systems that execute functions called by the application programs;
resource allocator user agents that transfer function calls from application programs running on one computer over the computer network to a second computer; and
resource allocator system agents that transfer function calls received over the computer network from a resource allocator user agent to a resource allocator system for execution; and
a flow control and data transmission interface both between application programs and the distributed resource allocator handling system that coordinates use of the computer resources by the application programs and between components of the distributed resource allocator handling system, the flow control and data transmission interface comprising:
an application programming interface that provides the functions that are called by the application programs and executed by a resource allocator system, including functions that registers new resources in a global network information database;
a remote access agent protocol used by a resource allocator user agent running on a local computer to encapsulate the application programming interface function calls made by an application program running on the local computer and transport the encapsulated function calls over the computer network to a resource allocator system agent running on a remote computer, and used by the resource allocator system agent to encapsulate data returned by a resource allocator system running on the remote computer in response to the function calls and transport the encapsulated data over the computer network to the resource allocator user agent; and
a remote access system protocol used by the resource allocator systems of the distributed resource allocator handling system to transfer data from one resource allocator system to another.

27. The flow control and data transmission interface of claim 26 wherein the application programming interface includes a Register-Resource function that causes the resource allocator handling system to add a description of a resource indicated by arguments to the Register-Resource function into the global network information database.

28. The flow control and data transmission interface of claim 26 wherein the application programming interface includes an Unregister-Resource function that cause the resource allocator handling system to delete a description of a resource indicated by arguments to the Unregister-Resource function from the global network information database.

29. In a computer network that interconnects computer resources, a method for exchanging function calls and data between application programs and a distributed resource allocator handling system that coordinates use of the computer resources by the application programs and for exchanging data between components of the distributed resource allocator handling system, the method comprising:
calling a function within an application program that is provided by an application programming interface and executed by a resource allocator system that executes functions called by the application programs;
when the resource allocator system is running on a different computer that on which the application programs is running,
passing the function call from the application program to a resource allocator user agent running on the same computer as that on which the application programs is running, wherein the resource allocator user agent transfers function calls from application programs running on one computer over the computer network to a second computer,
packaging the function call by the resource allocator user agent into a remote access agent protocol message and sending the remote access agent protocol message over the computer network to a resource allocator system agent running on the same computer as than on which the resource allocator system is running, wherein the resource allocator system agent transfers function calls received over the computer network from the resource allocator user agent to the resource allocator system for execution, and
unpackaging the function call from the received remote access agent protocol by the resource allocator system agent and passing the function call directly from the resource allocator system agent to the resource allocator system;
when the resource allocator system is running on the same computer as that on which the application programs is running, passing the function call directly from the application program to the resource allocator system;
executing the function by the resource allocator system and returning to the application program data provided by the resource allocator system as a result of execution of the function call; and
when execution of the function by the resource allocator system causes the resource allocator system to change data stored in a global network information database to describe a current state for the distributed resource allocator handling system and when more than one resource allocator system is running on the computer network, sending a resource allocator system protocol message from the resource allocator system that executed the function call to all remaining resource allocator systems running on the computer network so that all resource allocator systems can accordingly update their respective global network information databases, wherein the resource allocator system may invoke commands to register a new resource in the global network.

30. The method of claim 29 wherein the application programming interface includes a Register-Resource function that causes the resource allocator handling system to add a description of a resource indicated by arguments to the Register-Resource function into the global network information database.

31. The method of claim 29 wherein the application programming interface includes an Unregister-Resource function that cause the resource allocator handling system to delete a description of a resource indicated by arguments to the Unregister-Resource function from the global network information database.

32. In a distributed resource allocation handling system having a plurality of resources operating across a plurality of domains within a computer network, a method for registering a new resource comprising:

receiving a new resource request to add a new resource to the plurality of resources;

examining the new resource request to determine if the new resource request is compatible with the plurality of resources; and registering the new resource in a resource database if the new resource request is compatible.

33. The method recited in claim 32, further comprising the step of consulting a global directory to determine that the new resource request is compatible with resource component data stored in the global directory.

34. The system recited in claim 32, further comprising the step of adding new resource component data into a global directory.

35. The method recited in claim 32, further comprising the steps of:

consulting a global directory to determine that the new resource request is compatible with resource components stored in the global directory; and accepting the new resource request only if resource components of the new resource request correspond to resource components in the global directory.

36. The method recited in claim 35 wherein the resource components are organized in a tree structure in the global directory, further comprising the step of traversing the tree structure to obtain resource component data.

37. The method recited in claim 32 wherein each resource of the plurality of resources has a unique name that includes a domain of the resource and a location of the resource, further comprising the step of determining whether a name associated with the new resource request is unique with respect to plurality of resources.

38. The method of claim 32, further comprising the step of allocating the new resource to an application program upon receipt of an Allocate-Resource function from an application program interface, wherein the application programming interface interfaces between the application program and the distributed resource allocation handling system.

39. The method of claim 32 wherein each resource of the plurality of resources is described in a resource database as having a total capacity for handling a maximum number of tasks or dialogues and a remaining capacity that identifies that portion of the total capacity that has not been allocated to application programs.

40. The method of claim 32, further comprising the step of binding an application program to a portion of the distributed resource allocation handling system, wherein the binding step establishes a session between the distributed resource allocation handling system and the application program and provides to the application program a context in which to make subsequent function calls to the distributed resource allocation handling system.

41. The method of claim 32 wherein an application programming interface provides functions that are called by an application program and executed by a resource allocator that processes the resource request, including functions that allocate, deallocate, and make use of the resource.

42. The method of claim 32 wherein each resource is categorized and described in a resource database as being a member of one of two categories that include task-oriented and interaction-oriented resources, a task-oriented resource accepting and executing tasks assigned to it in resource requests without needing additional interaction with an application program assigning the task, and an interaction-oriented resource requiring a dialogue or interaction with an application program in order to complete tasks assigned to it in resource requests.

43. The method of claim 32 wherein a resource allocator user agent associated with a resource allocator transfers resource requests from application programs running on one computer over the computer network, and a resource allocator system agent transfers resource requests received over the computer network from the resource allocator user agent to the resource allocator for execution on a resource.

44. The method of claim 32 wherein an application programming interface includes a Begin-Allocating-Resource function that causes the resource allocator handling system to make the resource indicated by arguments to the Begin-Allocating-Resource function available for allocation by application programs.

45. The method of claim 32 wherein an application programming interface includes an Allocate-Resource function that causes the resource allocator handling system to allocate the resource indicated by arguments to the Allocate-Resource function to a calling application program for subsequent use by the calling application program.

46. The method of claim 32 wherein an application programming interface includes a Provide-Next-Task function that causes the resource allocator handling system to provide an indication of a next queued task in the queue to the resource.

47. The method of claim 32 wherein an application programming interface provides functions that are called by an application program that sends the resource request and executed by a resource allocator that processes the resource request.

48. The method of claim 32 wherein a resource allocator user agent associated with the resource allocator transfers resource requests from application programs running on one computer over the computer network, and a resource allocator system agent transfers resource requests received over the computer network from the resource allocator user agent to the resource allocator for execution on a resource.

49. The method of claim 32 wherein an application programming interface to an application program interfaces with a resource allocator that contains the receiver, wherein the application program interface includes an authentication mechanism that sends verification information to the resource allocator for verifying the application program.

50. The method of claim 32 wherein an application programming interface includes a Perform-Task function that causes a resource to perform a task indicated by arguments to the Perform-Task function on behalf of a resource allocator system that calls the function for execution by the resource.

51. In a distributed resource allocation handling system having a plurality of resources operating across a plurality of domains within a computer network, a computer-readable medium holding computer-executable instructions for performing a method for registering a new resource, comprising:

receiving a new resource request to add a new resource to the plurality of resources;

examining the new resource request to determine if the new resource request is compatible with the plurality of resources; and registering the new resource in a resource database if the new resource request is compatible.

52. The computer-readable medium of claim 51, further comprising the step of consulting a global directory to determine that the new resource request is compatible with resource component data stored in the global directory.

53. The computer-readable medium of claim 51, further comprising the step of adding new resource component data into the global directory.

54. The computer-readable medium of claim 51, further comprising the steps of:

consulting a global directory to determine that the new resource request is compatible with resource components stored in the global directory; and accepting the new resource request only if resource components of the new resource request correspond to resource components in the global directory.

55. In a distributed resource allocation handling system having a plurality of resources operating across a plurality of domains within a computer network, a computer-readable medium having a data structure, comprising:

a resource descriptor field that identifies at least one resource class that is provided to the distributed resource allocation system to build a description of a new resource; and a resource characteristics field that identifies at least one resource characteristic that is provided to the distributed resource allocation system to build a description of a new resource.

56. The computer-readable medium of claim 55, wherein the data structure resides in microcode in the resource.

57. The computer-readable medium of claim 55, wherein the data structure resides in microcode in the resource and the data structure has a format suited for transmission to a database maintained by the distributed resource allocation system.

\* \* \* \* \*